(12) United States Patent
Takatani et al.

(10) Patent No.: US 12,555,709 B2
(45) Date of Patent: Feb. 17, 2026

(54) GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Kazutoshi Takeda, Tokyo (JP); Masaru Takahashi, Tokyo (JP); Yoshiyuki Ushigami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 155 days.

(21) Appl. No.: 18/285,440

(22) PCT Filed: May 27, 2022

(86) PCT No.: PCT/JP2022/021839
§ 371 (c)(1),
(2) Date: Oct. 3, 2023

(87) PCT Pub. No.: WO2022/250163
PCT Pub. Date: Dec. 1, 2022

(65) Prior Publication Data
US 2024/0186042 A1    Jun. 6, 2024

(30) Foreign Application Priority Data

May 28, 2021   (JP) ................. 2021-090212

(51) Int. Cl.
*H01F 1/18*   (2006.01)
*C21D 1/74*   (2006.01)
(Continued)

(52) U.S. Cl.
CPC ................. *H01F 1/18* (2013.01); *C21D 1/74* (2013.01); *C21D 6/002* (2013.01); *C21D 6/005* (2013.01);
(Continued)

(58) Field of Classification Search
CPC .. H01F 1/18; H01F 1/147; C21D 1/74; C21D 6/002; C21D 6/005; C21D 6/008;
(Continued)

(56) References Cited

U.S. PATENT DOCUMENTS 3,932,236 A     1/1976 Wada et al.
2003/0180553 A1*  9/2003 Shigesato ............ C21D 8/1272
                                            427/127
(Continued)

FOREIGN PATENT DOCUMENTS

JP              49-96920 A      9/1974
WO         WO 02/088403 A1    11/2002
(Continued)

*Primary Examiner* — Megha M Gaitonde
(74) *Attorney, Agent, or Firm* — Birch, Stewart, Kolasch & Birch, LLP

(57) ABSTRACT

Provided is a grain oriented electrical steel sheet including a base metal steel sheet, an intermediate layer and an insulation coating, wherein: the intermediate layer is an oxide film; an average thickness of the oxide film is 2-500 nm; the insulation coating is a phosphate coating; an average thickness of the insulation coating is 0.1-10 μm. When grazing incidence X-ray diffraction is performed on the phosphate coating using a Co-Kα excitation source, the X-ray diffraction pattern has a diffraction peak originating from cristobalite-type aluminum phosphate at a diffraction angle of 2θ=24.8°; a half value width $FWHM_{0.5}$ of the diffraction peak under a diffraction condition with an X-ray incident angle ω=0.5° and a half value width $FWHM_{1.0}$ of the diffraction peak under a diffraction condition with an X-ray incident angle ω=1.0° satisfy $0.20° \leq FWHM_{0.5} \leq 2.00°$, $0.20° \leq FWHM_{1.0} \leq 2.00°$, and $0° \leq |FWHM_{0.5} - FWHM_{1.0}| \leq 1.00°$.

1 Claim, 2 Drawing Sheets

(51) Int. Cl.

| | | |
|---|---|---|
| *C21D 6/00* | (2006.01) | |
| *C21D 8/0278* | (2026.01) | |
| *C21D 8/1216* | (2026.01) | |
| *C21D 8/1244* | (2026.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C22C 38/34* | (2006.01) | |
| *C22C 38/60* | (2006.01) | |
| *C23C 22/82* | (2006.01) | |
| *C23C 28/04* | (2006.01) | |

(52) U.S. Cl.
CPC ........... *C21D 6/008* (2013.01); *C21D 8/0284* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/60* (2013.01); *C23C 22/82* (2013.01); *C23C 28/04* (2013.01)

(58) Field of Classification Search
CPC .. C21D 8/0284; C21D 8/1222; C21D 8/1244; C21D 8/1233; C21D 8/1255; C21D 8/1261; C21D 8/1266; C21D 8/1272; C21D 8/1283; C21D 8/1294; C21D 9/46; C21D 2201/05; C22C 38/001; C22C 38/002; C22C 38/004; C22C 38/008; C22C 38/02; C22C 38/04; C22C 38/06; C22C 38/12; C22C 38/14; C22C 38/20; C22C 38/22; C22C 38/24; C22C 38/26; C22C 38/28; C22C 38/32; C22C 38/34; C22C 38/40; C22C 38/60; C22C 38/82; C23C 28/04; C23C 22/00; C23C 22/12; C23C 22/18; C23C 22/20; C23C 22/22; C23C 22/33; C23C 22/42; C23C 22/43; C23C 22/74; B32B 15/04; B32B 15/18; B32B 15/20; C23G 1/08
USPC ................ 148/100, 110–113, 300, 306–311; 428/156, 161, 163, 164, 167, 172, 173, 428/212, 213, 215, 220, 446, 450, 457, 428/469, 470
See application file for complete search history.

(56) References Cited

U.S. PATENT DOCUMENTS

| | | |
|---|---|---|
| 2003/0188806 A1 | 10/2003 | Fujii et al. |
| 2018/0230565 A1* | 8/2018 | Watanabe ................ H01F 1/18 |
| 2020/0123632 A1 | 4/2020 | Takatani et al. |
| 2020/0123662 A1 | 4/2020 | Takebayashi et al. |
| 2022/0068526 A1 | 3/2022 | Ushigami et al. |

FOREIGN PATENT DOCUMENTS

| | | | |
|---|---|---|---|
| WO | WO 2019/013348 A1 | 1/2019 | |
| WO | WO 2019/013353 A1 | 1/2019 | |
| WO | WO-2019182154 A1 * | 9/2019 | ............... C21D 1/26 |
| WO | WO 2020/149340 A1 | 7/2020 | |

* cited by examiner

GRAIN-ORIENTED ELECTRICAL STEEL SHEET

TECHNICAL FIELD

The present invention relates to a grain oriented electrical steel sheet.

BACKGROUND ART

A grain oriented electrical steel sheet is mainly used in transformers. Since transformers are continuously excited and continue to generate energy loss over a long period of time from installation to disposal, the energy loss when magnetized by AC, i.e., iron loss, is a major index to determine the performance of transformers.

Many methods have been proposed to reduce iron loss in grain-oriented electrical steel sheets. There are methods, for example: to increase accumulation of the {110}<001> orientation, which is called the Goss orientation, to increase the content of solid solution elements such as Si, which increases electrical resistance, and to reduce the thickness of the steel sheet.

It is also known that applying tension to steel sheets is an effective method for reducing iron loss. Therefore, a coating is usually formed on the surface of grain-oriented electrical steel sheets for the purpose of reducing iron loss. This coating reduces the iron loss of the steel sheet as a single sheet by imparting tension to the steel sheet. This coating also reduces iron loss as an iron core by ensuring electrical insulation between steel sheets when grain-oriented electrical steel sheets are stacked.

As a grain-oriented electrical steel sheet with a coating, a forsterite film, which is an oxide film containing Mg, is formed on the surface of the base metal steel sheet, and an insulation coating is formed on the surface of the forsterite film. That is, in this case, the coating on the base metal steel sheet includes a forsterite film and an insulation coating. Each of the forsterite film and the insulation coating has both an insulating function and a tension-imparting function on the base metal steel sheet.

The forsterite film is formed by the reaction of an annealing separator composed mainly of magnesia (MgO), and silicon oxide ($SiO_2$) formed on the base metal steel sheet during decarburization annealing, which causes secondary recrystallization of the steel sheet, during heat treatment at 900 to 1200° C. for 30 hours or more.

The insulation coatings are formed by applying a coating solution containing, for example, phosphoric acid or phosphate, colloidal silica, and chromic anhydride or chromate to the steel sheet after final annealing, and bake-drying at 300 to 950° C. for 10 seconds or more.

In order for such coating to perform its function of insulating and imparting tension to the base metal steel sheet, high adhesion between the coating and the base metal steel sheet is required.

Conventionally, the above adhesion has been ensured mainly by the anchoring effect of the unevenness of the interface between the base metal steel sheet and the forsterite film. Recently, however, it has become clarified that the unevenness of the interface hinders the movement of the magnetic wall during the magnetization of the grain-oriented electrical steel sheet thereby adversely hindering low iron loss.

Therefore, in order to further reduce iron loss, a technology to form an insulation coating with a smooth surface of the base metal steel sheet without a forsterite film on the base metal steel sheet has been proposed in, for example, Patent Documents 1 and 2.

In the manufacturing method for grain-oriented electrical steel sheets disclosed in Patent Document 1, the forsterite film is removed by pickling, etc., and the surface of the base metal steel sheet is smoothed by chemical polishing or electropolishing. In the manufacturing method for grain-oriented electrical steel sheets disclosed in Patent Document 2, an annealing separator containing alumina ($Al_2O_3$) is used during final annealing to suppress the formation of forsterite film itself and smooth the base metal steel sheet surface.

However, in the manufacturing methods of Patent Documents 1 and 2, when the insulation coating is formed in contact with the surface of the base metal steel sheet (directly on the surface of the base metal steel sheet), there is a problem that the insulation coating is difficult to adhere to the surface of the base metal steel sheet (sufficient adhesion is not obtained).

Therefore, in order to ensure coating adhesion, technologies to improve the adhesion of the insulation coating by controlling the form of the insulation coating or the form of the intermediate layer formed between the base metal steel sheet and the insulation coating have been proposed in, for example, Patent Documents 3 and 4.

In the grain-oriented electrical steel sheet disclosed in Patent Document 3, the insulation coating includes a crystalline phosphide-containing layer that contains crystalline phosphide. In the grain-oriented electrical steel sheet disclosed in Patent Document 4, when X-ray diffraction is performed using a Co-Kα excitation source for the insulation coating, a FWHM-Co, which is a half value width of a peak appearing at 2θ=24.8°, is 2.5° or less.

LIST OF PRIOR ART DOCUMENT

Patent Document

Patent Document 1: JP49-096920A
Patent Document 2: WO2002/088403
Patent Document 3: WO2019/013353
Patent Document 4: WO2019/013348

SUMMARY OF INVENTION

Technical Problem

As mentioned above, smoothing the surface of the base metal steel sheet of a grain-oriented electrical steel sheet is effective in reducing iron loss in grain-oriented electrical steel sheets. However, if the surface of the base metal steel sheet is smoothed, the adhesiveness of the insulation coating will decrease.

With the technologies disclosed in Patent Documents 1 and 2, it cannot be said that the coating adhesion is sufficient. In addition, the technologies disclosed in Patent Documents 3 and 4 certainly increase coating adhesion, but the present inventors have found that there is still room for further improvement in terms of coating adhesion.

In addition, it is common for the insulation coating of grain-oriented electrical steel sheets to contain chromate, and the technology disclosed in Patent Document 4 also assumes the use of chromic acid. However, in recent years, among growing awareness of environmental issues, chromate-free insulation coatings are being sought.

The present invention was made in view of the above-mentioned problems. An object of the present invention is to provide a grain-oriented electrical steel sheet with excellent adhesion of insulation coating even without forsterite film.

The present invention was made to solve the above-mentioned problems, and the scope thereof is a grain-oriented electrical steel sheet as follows.

Solution to Problem (1) A grain-oriented electrical steel sheet according to one embodiment of the present invention includes:
a base metal steel sheet,
an intermediate layer disposed on and in contact with the base metal steel sheet, and
an insulation coating disposed on and in contact with the intermediate layer,
wherein the intermediate layer is an oxide film satisfying the followings:
Si content: 20 to 70 atomic %,
O content: 30 to 80 atomic %,
Mg content: 20 atomic % or less,
P content: 5 atomic % or less, and
Fe content: less than 20 atomic %; and
the average thickness of the oxide film is 2 to 500 nm; and
wherein the insulation coating is a phosphate coating satisfying the followings:
P content: 5 to 30 atomic %,
Si content: 5 to 30 atomic %,
O content: 30 to 80 atomic %,
Al content: 0.1 to 10 atomic %,
Cr content: less than 1 atomic %,
Fe content: less than 25 atomic %,
Mg content: 0 to 10 atomic %,
Mn content: 0 to 10 atomic %,
Ni content: 0 to 10 atomic %,
Zn content: 0 to 10 atomic %,
V content: 0 to 10 atomic %,
W content: 0 to 10 atomic %,
Zr content: 0 to 10 atomic %,
Co content: 0 to 10 atomic %, and
Mo content: 0 to 10 atomic %, and
the average thickness of the phosphate coating is between 0.1 μm and 10 μm, and
wherein when grazing incidence X-ray diffraction is performed on the phosphate coating using a Co-Kα excitation source, the X-ray diffraction pattern has a diffraction peak originating from cristobalite-type aluminum phosphate at a diffraction angle of 2θ=24.80, and
when a half value width of a diffraction peak under a diffraction condition where the X-ray incident angle ω=0.5° is represented as $FWHM_{0.5}$ and a half value width of a diffraction peak under the diffraction condition where the X-ray incident angle ω=1.0° is represented as $FWHM_{1.0}$, $FWHM_{0.5}$ and $FWHM_{1.0}$ satisfy the followings:
$0.20° \leq FWHM_{0.5} \leq 2.00°$,
$0.20° \leq FWHM_{1.0} \leq 2.00°$, and
$0° \leq |FWHM_{0.5} - FWHM_{1.0}| \leq 1.00°$.

Advantageous Effect of Invention

According to the above embodiment of the present invention, a grain-oriented electrical steel sheet with excellent insulation coating adhesion can be provided even without a forsterite film.

DESCRIPTION OF EMBODIMENTS

The following is a detailed description of a preferable embodiment of the present invention. However, the present invention is not limited only to the configuration disclosed in this embodiment, and various changes can be made without departing from the purpose of the present invention. The numerical limitation range shown in the present embodiment includes a lower limit and an upper limit. Numerical values indicated as "more than" or "less than" are not included in the numerical range. Unless otherwise specified, "%" for the content of each element means "mass %" for the base metal steel sheet and "atomic %" for the intermediate layer and insulation coating.

Figure 1:
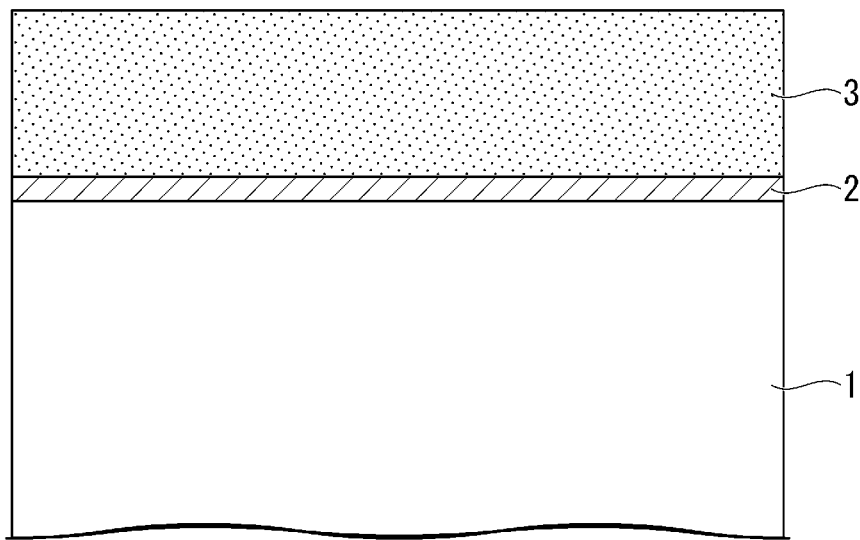
FIG. 1 is a cross-sectional schema showing a layer structure of a grain-oriented electrical steel sheet according to an embodiment of the present invention.

FIG. 1 is a cross-sectional schema showing a layer structure of a grain-oriented electrical steel sheet in an embodiment of the present invention. As shown in FIG. 1, the grain-oriented electrical steel sheet of the present embodiment has no forsterite film on the surface of the base metal steel sheet 1 when viewed on a cutting plane where the cutting direction is parallel to the thickness direction, has an intermediate layer 2 consisting mainly of silicon oxide on the surface of the base metal steel sheet 1, and on this intermediate layer 2 has an insulation coating 3 derived from aluminum phosphate and colloidal silica.

Specifically, a grain-oriented electrical steel sheet according to the present embodiment includes:
a base metal steel sheet,
an intermediate layer disposed on and in contact with the base metal steel sheet, and
an insulation coating disposed on and in contact with the intermediate layer,
wherein the intermediate layer is an oxide film satisfying the followings:
Si content: 20 to 70 atomic %,
O content: 30 to 80 atomic %,
Mg content: 20 atomic % or less,
P content: 5 atomic % or less, and
Fe content: less than 20 atomic %; and
the average thickness of the oxide film is 2 to 500 nm; and
wherein the insulation coating is a phosphate coating satisfying the followings:
P content: 5 to 30 atomic %,
Si content: 5 to 30 atomic %,
O content: 30 to 80 atomic %,
Al content: 0.1 to 10 atomic %,
Cr content: less than 1 atomic %,
Fe content: less than 25 atomic %,
Mg content: 0 to 10 atomic %,
Mn content: 0 to 10 atomic %,
Ni content: 0 to 10 atomic %,
Zn content: 0 to 10 atomic %,
V content: 0 to 10 atomic %, W content: 0 to 10 atomic %,
Zr content: 0 to 10 atomic %,
Co content: 0 to 10 atomic %, and
Mo content: 0 to 10 atomic %, and
the average thickness of the phosphate coating is between 0.1 μm and 10 μm, and
wherein when grazing incidence X-ray diffraction is performed on the phosphate coating using a Co-Kα excitation source, the X-ray diffraction pattern has a diffraction peak originating from cristobalite-type aluminum phosphate at a diffraction angle of 2θ=24.80, and
when a half value width of a diffraction peak under a diffraction condition where the X-ray incident angle ω=0.5° is represented as $FWHM_{0.5}$ and a half value width of a diffraction peak under the diffraction condition where the X-ray incident angle ω=1.0° is represented as $FWHM_{1.0}$, $FWHM_{0.5}$ and $FWHM_{1.0}$ satisfy the followings:
$0.20° \leq FWHM_{0.5} \leq 2.00°$,
$0.20° \leq FWHM_{1.0} \leq 2.00°$, and
$0° \leq |FWHM_{0.5} - FWHM_{1.0}| \leq 1.00°$.

In conventional grain-oriented electrical steel sheets, the insulation coating is amorphous, so when X-ray diffraction is performed on the insulation coating, the X-ray diffraction pattern becomes a halo pattern and no clear diffraction peaks are observed. On the other hand, in the grain-oriented electrical steel sheet of the present embodiment, when X-ray diffraction is performed on the phosphate coating (insulation coating), the X-ray diffraction pattern has a clear diffraction peak in addition to a halo pattern. This diffraction peak is derived from cristobalite-type aluminum phosphate. That is, in the grain-oriented electrical steel sheet of the present embodiment, a portion of the phosphate coating is crystallized to become cristobalite-type aluminum phosphate.

In general, a half value width of a diffraction peak is an indicator of the degree of crystallinity, and a smaller value of the half value width indicates a higher degree of crystallinity. In the grain-oriented electrical steel sheet of the present embodiment, the half value width of the diffraction peak originating from cristobalite-type aluminum phosphate is less than a predetermined value. In other words, in the grain-oriented electrical steel sheet of the present embodiment, crystalline cristobalite-type aluminum phosphate is formed in the phosphate coating, and its crystallinity is high.

Under the diffraction condition where the X-ray incidence angle ω=0.5°, an X-ray diffraction pattern originating from the topmost surface region of the phosphate coating is obtained because the X-rays penetrate only to the topmost surface region of the phosphate coating. On the other hand, under the diffraction conditions where the X-ray incident angle ω=1.0°, X-rays penetrate to the inner region of the phosphate coating, so that an X-ray diffraction pattern originating from the relatively inner region of the phosphate coating is obtained.

In the grain-oriented electrical steel sheet of the present embodiment, the above half value width is less than a predetermined value in both the topmost surface region and the inner region of the phosphate coating, and the difference in the above half value width between the topmost surface region and the inner region is small. In other words, in the grain-oriented electrical steel sheet of the present embodiment, cristobalite-type aluminum phosphate, which is crystalline, is partially formed in the amorphous phosphate coating in both the topmost surface region and the inner region of the phosphate coating, the degree of crystallinity is high, and there is no significant difference in the degree of crystallinity between the topmost surface region and the inner region.

Each feature is described in detail below. First, the phosphate coating of the grain-oriented electrical steel sheet of the present embodiment will be described.

<Phosphate Coating>

The phosphate coating is located on the top surface of the layer structure of the grain-oriented electrical steel sheet. The phosphate coating is formed on the base metal steel sheet in a high-temperature environment using a material with a lower coefficient of thermal expansion than the base metal steel sheet, which causes a shrinkage difference between the phosphate coating and the base metal steel sheet during cooling, resulting in the phosphate coating exerting tension on the base metal steel sheet. The iron loss property of the grain-oriented electrical steel sheet in which tension is imparted to the base metal steel sheet is favorably improved.

In order for the phosphate coating to impart tension to the base metal steel sheet, it is important that the phosphate coating and the base metal steel sheet adhere to each other through the oxide film described below. In the grain-oriented electrical steel sheet of the present embodiment, in order to improve coating adhesion, the coating composition and thickness of the phosphate coating are controlled, and the crystalline cristobalite-type aluminum phosphate is partially formed in the amorphous phosphate coating to control its crystallization state.

First, the coating composition of the phosphate coating is described.

In the grain-oriented electrical steel sheet of the present embodiment, the phosphate coating contains basic elements and, if necessary, selective elements as the coating composition. Preferably, the remainder of the basic and selective elements is impurities.

Specifically, the phosphate coating needs to satisfy the followings, as basic elements:
P content: 5 to 30 atomic %,
Si content: 5 to 30 atomic %,
O content: 30 to 80 atomic %, and
Al content: 0.1 to 10 atomic %.

In addition, the phosphate coating may satisfy the followings, as selective elements:
Mg content: 0 to 10 atomic %,
Mn content: 0 to 10 atomic %,
Ni content: 0 to 10 atomic %,
Zn content: 0 to 10 atomic %,
V content: 0 to 10 atomic %,
W content: 0 to 10 atomic %,
Zr content: 0 to 10 atomic %,
Co content: 0 to 10 atomic %, and
Mo content: 0 to 10 atomic %.

Furthermore, the phosphate coating needs to satisfy, as impurities, the followings:
Cr content: less than 1 atomic %, and
Fe content: less than 25 atomic %.

P, Si, O, and Al, the basic elements of the phosphate coating described above, are derived from aluminum phosphate and colloidal silica contained in the coating solution and from oxidation reactions during baking. The P content is preferably 8 atomic % or more; the P content is preferably 23 atomic % or less, or more preferably 17 atomic % or less. The Si content is preferably 10 atomic % or more; the Si content is preferably 25 atomic % or less, and more preferably 20 atomic % or less. The O content is preferably 40 atomic % or more, and more preferably 50 atomic % or more; the O content is preferably 75 atomic % or less. The Al content is preferably 1 atomic % or more; the Al content is preferably 7 atomic % or less, and more preferably 4 atomic % or less.

The phosphate coating described above may also contain Mg, Mn, Ni, Zn, V, W, Zr, Co, and Mo as selective elements. These selective elements may be derived from phosphates in the coating solution or may be included in the phosphate coating by other means.

The inclusion of one or more elements selected from Mg, Mn, Ni, Zn, V, W, Zr, Co, and Mo has the effect of improving the water resistance of the phosphate coating. To obtain this effect, it is preferable to contain one or more of these elements in a total amount of 0.1 atomic % or more. 10 atomic % or less of any of these elements will not interfere with the effect of the invention; 5 atomic % or less is preferable, and 3 atomic % or less is more preferable.

When two or more selected from Mg, Mn, Ni, Zn, V, W, Zr, Co, and Mo are contained in a combination, the total content of Mg+Mn+Ni+Zn is preferably 10 atomic % or less, and the total content of V+W+Zr+Co+Mo is preferably 10 atomic % or less.

The above-mentioned Cr and Fe are impurities in the phosphate coating, and these impurities are derived from elements that are mixed in from the raw materials or manufacturing environment when forming the phosphate coating, or from elements that diffuse from the base metal steel sheet. The lower limits of the impurity contents are not restricted, and may be set to 0%, as less is preferable.

In the grain-oriented electrical steel sheet of the present embodiment, the coating composition of the phosphate coating needs to satisfy the above conditions in order to improve coating adhesion. In particular, the Cr content of the phosphate coating, which is included as an impurity, is limited to less than 1 atomic %.

Generally, the phosphate coatings on grain-oriented electrical steel sheets are formed by baking a coating solution containing phosphate, colloidal silica, and chromate. The chromate is added to improve corrosion resistance, chemical resistance, and to suppress voids.

On the other hand, the phosphate coating of the grain oriented electrical steel sheet according to the present embodiment is formed by baking a coating solution that contains aluminum phosphate and colloidal silica but no chromate. Therefore, as mentioned above, in the phosphate coating of the grain-oriented electrical steel sheet of the present embodiment, the Cr content is limited to less than 1 atomic %. The Cr content is preferably 0.8 atomic % or less, and more preferably 0.5 atomic % or less.

In the grain-oriented electrical steel sheet according to the present embodiment, limiting the Cr content of the phosphate coating to less than 1 atomic % is one of the requirements for controlling the crystallization state of cristobalite-type aluminum phosphate in the phosphate coating. Details of the requirements for controlling cristobalite-type aluminum phosphate are described below.

The coating composition of the phosphate coating is determined by SEM-EDS (Scanning Electron Microscope-Energy Dispersive X-ray Spectroscopy) or TEM-EDS (Transmission Electron Microscope-Energy Dispersive X-ray Spectroscopy) to analyze the composition of the cut surface. Details of the method for measuring coating composition are described below.

Next, the coating thickness of the phosphate coating is described.

In the grain-oriented electrical steel sheet of the present embodiment, the average thickness of the phosphate coating is 0.1 to 10 μm when viewed on a cutting plane where the cutting direction is parallel to the thickness direction.

If the average thickness of the phosphate coating is less than 0.1 μm, it becomes difficult to impart the required tension to the base metal steel sheet. Thus, the average thickness is 0.1 μm or more, preferably 0.3 μm or more, or 0.5 μm or more, and more preferably 1 μm or more.

On the other hand, the average thickness of the phosphate coating of more than 10 μm increases the production cost, and results in a low space factor when grain-oriented electrical steel sheets are stacked to form an iron core. Therefore, the average coating thickness is preferably 10 μm or less, and more preferably 5 m or less.

The average coating thickness of the phosphate coating can be determined by line analysis of the cut surface using SEM-EDS or TEM-EDS. Details of the method for measuring average coating thickness are described below.

Next, the crystallization state of cristobalite-type aluminum phosphate in the phosphate coating is described.

Figure 2:
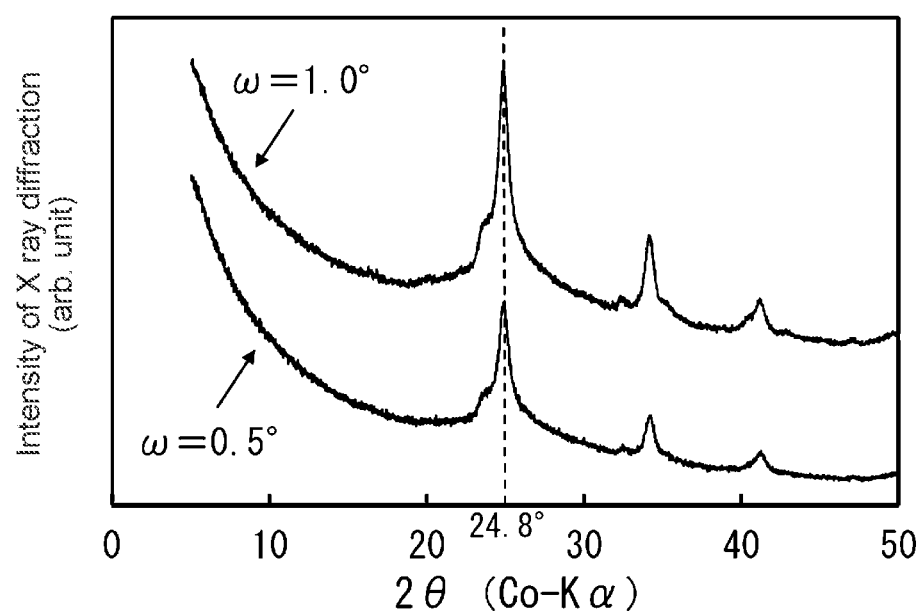
FIG. 2 is a diagram showing an X-ray diffraction pattern obtained by grazing incidence X-ray diffraction using a Co-Kα excitation source for the phosphate coating of the grain-oriented electrical steel sheet according to the present embodiment.

FIG. 2 shows X-ray diffraction patterns obtained by grazing incidence X-ray diffraction using a Co-Kα excitation source for the phosphate coating of the grain-oriented electrical steel sheet according to the present embodiment.

In the grain-oriented electrical steel sheet of the present embodiment, when grazing incidence X-ray diffraction is performed using a Co-Kα excitation source on the phosphate coating, the X-ray diffraction pattern has a diffraction peak originating from cristobalite-type aluminum phosphate at a diffraction angle of 2θ=24.8°. In addition, when the half value width of the above diffraction peak under the diffraction condition where the X-ray incident angle ω=0.5° is represented as $FWHM_{0.5}$ and the half value width of the above diffraction peak under the diffraction condition where the X-ray incident angle ω=1.0° is represented as $FWHM_{1.0}$, $FWHM_{0.5}$ and $FWHM_{1.0}$ satisfies the followings:

$0.20° \leq FWHM_{0.5} \leq 2.00°$,
$0.20° \leq FWHM_{1.0} \leq 2.00°$, and
$0° \leq |FWHM_{0.5} - FWHM_{1.0}| \leq 1.00°$.

When crystalline cristobalite-type aluminum phosphate is partially contained in an amorphous phosphate coating, the crystallinity is high, and there is no significant difference in the degree of crystallinity between the surface and interior regions of the phosphate coating, the coating adhesion is favorably improved. The details of the reason for this are not known at the present time, but the following effects are conceivable.

When aluminum phosphate crystallizes in the phosphate coating, water is generated, which promotes the formation of the intermediate layer and improves coating adhesion. However, if aluminum phosphate crystallizes locally in the phosphate coating, for example, if aluminum phosphate crystallizes preferentially in the topmost surface region of the phosphate coating, when the grain-oriented electrical steel sheet is bent to manufacture a transformer, stress may locally concentrate on the aluminum phosphate crystallized in the phosphate coating, causing the coating to peel off.

On the other hand, in the grain-oriented electrical steel sheet of the present embodiment, since the crystallization state of aluminum phosphate is homogenized between the surface and interior regions of the phosphate coating, local stress concentration is suppressed even when bending is performed, and as a result, the phosphate coating is considered to be difficult to peel off. This tendency is more pronounced when bending is performed under severe conditions.

In order to control the crystallization state of cristobalite-type aluminum phosphate, which is partially crystallized in the phosphate coating, as described above, the following two requirements need to be satisfied.
(I) The phosphate coating must satisfy a Cr content of less than 1 atomic % as the coating composition.
(II) The formation conditions must be controlled when forming the phosphate coating.

Only when all of these two requirements are satisfied, the crystallization state of the crystalline cristobalite-type aluminum phosphate contained in the amorphous phosphate coating can be controlled as described above.

First, as requirement (I), it is important that the Cr content be less than 1 atomic % as the coating composition of the phosphate coating. If the Cr content in the phosphate coating is 1 atomic % or more, the crystallization of the cristobalite-type aluminum phosphate in the phosphate coating is significantly inhibited. In particular, the cristobalite-type aluminum phosphate is difficult to crystallize in the inner region of the phosphate coating.

The reason why the crystallization of cristobalite aluminum phosphate is inhibited in the phosphate coating when the Cr content of the phosphate coating is 1 atomic % or more is unknown in detail at the present time, but the following causes are conceivable. When the Cr content in the phosphate coating is 1 atomic % or more, the reaction between a terminal structure of the phosphate molecular chain and Cr enhances chemical stability and inhibits the crystallization of aluminum phosphate.

On the other hand, if the Cr content of the phosphate coating is less than 1 atomic %, the phosphate does not react with Cr, and as a result, cristobalite-type aluminum phosphate is considered to crystallize more easily in the phosphate coating.

Next, as requirement (II), it is important to control the formation conditions during the phosphate coating formation. Even if requirement (I) is satisfied, it is difficult to crystallize cristobalite-type aluminum phosphate in the amorphous phosphate coating in the above state unless the formation conditions are suitably controlled during the phosphate coating formation. For example, if requirement (I) is satisfied but requirement (II) is not satisfied, the crystallization state of cristobalite-type aluminum phosphate may be controlled in the topmost surface region of the phosphate coating, but the crystallization state of cristobalite-type aluminum phosphate is not controlled in the interior region of the phosphate coating.

Specifically, it is important to control the heating rate from room temperature to 350° C. as the formation condition during the phosphate coating formation. That is, it is important that the heating rate before the crystallization of aluminum phosphate begins is less than 30° C./sec. If the heating rate from room temperature to 350° C. is less than 30° C./second, the temperature difference between the topmost surface region and the interior region of the coating solution will be small. As a result, when the coating solution is baked to form a phosphate coating, the temperature difference between the topmost surface region and the interior region of the phosphate coating is small, and the crystallization state of cristobalite-type aluminum phosphate is uniformly controlled.

When grazing incidence X-ray diffraction is performed on a phosphate coating using a Co-Kα excitation source and the resulting X-ray diffraction pattern has a diffraction peak at a diffraction angle of 2θ=24.8°, it can be judged that crystalline cristobalite-type aluminum phosphate exists in the amorphous phosphate coating.

When the $FWHM_{0.5}$, which is the half value width of the diffraction peak appearing at the diffraction angle 2θ=24.8° under the diffraction condition where the X-ray incident angle ω=0.5°, is 2.00° or less, the crystallinity of cristobalite-type aluminum phosphate in the top surface area of the phosphate coating is considered high. The upper limit of $FWHM_{0.5}$ is preferably 1.80°, and more preferably 1.60°. On the other hand, if crystallization progresses excessively, the reaction with colloidal silica is suppressed and coating tension cannot be obtained, so the lower limit of $FWHM_{0.5}$ is 0.20°.

Similarly, when $FWHM_{1.0}$, which is the half value width of the diffraction peak that appears at the diffraction angle 2θ=24.8° under the diffraction condition where the X-ray incident angle ω=1.0°, is 2.00° or less, the degree of crystallinity of cristobalite-type aluminum phosphate in the internal region of phosphate coating can be judged high. The upper limit of $FWHM_{1.0}$ is preferably 1.80°, and more preferably 1.60°. On the other hand, if crystallization is excessively advanced, the reaction with colloidal silica is suppressed and coating tension cannot be obtained, so the lower limit of $FWHM_{1.0}$ is 0.20°.

When the absolute value of the difference between $FWHM_{0.5}$ and $FWHM_{1.0}$, $|FWHM_{0.5}-FWHM_{1.0}|$ is 1.00° or less, there is no significant difference in the crystallinity of cristobalite-type aluminum phosphate between the topmost surface region and the interior region of the phosphate coating. The upper limit of $|FWHM_{0.5}-FWHM_{1.0}|$ is preferably 0.80°. On the other hand, the lower limit of $|FWHM_{0.5}-FWHM_{1.0}|$ is not restricted, and the smaller the limit, the more desirable it is. Therefore, the lower limit of $|FWHM_{0.5}-FWHM_{1.0}|$ is 0°. However, if it is not industrially easy to set the lower limit of $|FWHM_{0.5}-FWHM_{1.0}|$ to 0°, for example, the lower limit of $|FWHM_{0.5}-FWHM_{1.0}|$ may be 0.05°.

When the crystalline cristobalite-type aluminum phosphate contained in the amorphous phosphate coating is controlled as described above, the coating adhesion is excellent even if the intermediate layer is a Si-based oxide film instead of a forsterite film, i.e., even if the base metal steel sheet surface is smooth.

The diffraction peak that appears at a diffraction angle of 2θ=34.3° originates from crystalline tridymite-type aluminum phosphate contained in the amorphous phosphate coating. Tridymite-type aluminum phosphate is considered to be a crystalline material corresponding to the intermediate stage of crystallization to cristobalite-type aluminum phosphate. That is, the high content of tridymite aluminum phosphate means that the crystallization of cristobalite aluminum phosphate is insufficient.

In particular, even if the crystallization of cristobalite-type aluminum phosphate is sufficiently advanced in the topmost surface region of the phosphate coating, if the crystallization of cristobalite-type aluminum phosphate is not sufficiently advanced in the inner region, the peak intensity of tridymite-type aluminum phosphate in the topmost surface region will be relatively high in the topmost surface region. Therefore, it is preferable that the peak intensity of the diffraction peak appearing at the diffraction angle 2θ=34.3° be 0.50 times or less than the peak intensity of the diffraction peak appearing at the diffraction angle 2θ=24.8° under the diffraction conditions where the X-ray incident angle ω=0.5°.

The crystallization state of cristobalite-type aluminum phosphate in the phosphate coating can be confirmed by grazing incidence X-ray diffraction using a Co-Kα excitation source. Specifically, it can be confirmed by conducting grazing incidence X-ray diffraction using a Co-Kα excitation source on the phosphate coating under the conditions that the X-ray incidence angle ω is 0.5° and 1.0°, and check both half value widths of the diffraction peak that appears at a diffraction angle of 2θ=24.8°.

Similarly, the peak intensities of cristobalite-type aluminum phosphate and tridymite-type aluminum phosphate in the phosphate coating can also be confirmed by grazing incidence X-ray diffraction using a Co-Kα excitation source. Specifically, grazing incidence X-ray diffraction using a Co-Kα excitation source can be performed on the phosphate coating to check the peak intensities of the diffraction peaks appearing at diffraction angles 2θ of 24.8° and 34.3° under an X-ray incidence angle ω of 0.5°. Details of the grazing incidence X-ray diffraction measurement method are described below.

Next, the oxide film, which is the intermediate layer of the grain-oriented electrical steel sheet according to the present embodiment, will be explained.

<Oxide Film>

The oxide film is located between the phosphate coating and the base metal steel sheet in the layer structure of the grain-oriented electrical steel sheet. This oxide film is not a forsterite film but a Si-based oxide film, and it has a function of adhering the phosphate coating to the base metal steel sheet.

First, the film composition of the oxide film is described.

In the grain-oriented electrical steel sheet of the present embodiment, the oxide film contains basic elements as the film composition. In addition to the basic elements, selective elements may be included as necessary. The remainder of the basic elements and selective elements should be impurities.

Specifically, the oxide film should satisfy the followings, as basic elements:

Si content: 20 to 70 atomic %, and
O content: 30 to 80 atomic %.

The oxide film may also contain constituent elements of the base metal steel sheet as selective elements, and the total content of those may satisfy 0.1 to 20 atomic %. In addition, the oxide film needs to satisfy, as impurities:

Mg content: 20 atomic % or less,
P content: 5 atomic % or less, and
Fe content: less than 20 atomic %.

Generally, a forsterite film ($Mg_2SiO_4$-based film) is formed as an intermediate layer on grain-oriented electrical steel sheets by applying an annealing separator composed mainly of MgO to decarburization-annealed sheets and then subjecting them to final annealing.

When the above-mentioned forsterite film is formed, coating adhesion is ensured by the anchor effect of the uneven interface between the forsterite film and the base metal steel sheet. However, the unevenness of the interface becomes an obstacle to magnetic wall movement when the grain-oriented electrical steel sheet is magnetized, adversely affecting iron loss characteristics.

In the grain-oriented electrical steel sheet according to the present embodiment, the interface between the intermediate layer and the base metal steel sheet is intended to be smooth without the presence of forsterite film. Then, in order to improve coating adhesion even when this interface is made smooth, the above requirements (I) and (II) are satisfied to control the crystallization state of cristobalite-type aluminum phosphate in both the topmost surface region and the inner region of the phosphate coating. When the intermediate layer is a forsterite film, the issue of coating adhesion between the insulation coating and the forsterite film does not arise in the first place. Therefore, in the grain-oriented electrical steel sheet of the present embodiment, the intermediate layer is a Si-based oxide film.

Therefore, as described above, in the oxide film (intermediate layer) of the grain-oriented electrical steel sheet according to the present embodiment, the Mg content is limited to 20 atomic % or less; the Mg content is preferably less than 20 atomic %, more preferably 15 atomic % or less, and even more preferably 10 atomic % or less. The details of the control conditions for forming the oxide film (intermediate layer) without forming a forsterite film are described below.

Si and O, the basic elements of the oxide film described above, are derived from the constituent elements of the base metal steel sheet and the oxidation reaction when the oxide film is formed. The Si content is preferably 55 atomic % or less, and more preferably 45 atomic % or less. The O content is preferably 45 atomic % or more, and preferably 75 atomic % or less, and more preferably 65 atomic % or less.

The Mg, P, and Fe mentioned above are impurities in the oxide film, and these impurities are derived from elements that are mixed in from the raw materials or manufacturing environment, or diffuse from the base metal steel sheet or phosphate coating. The P content is preferably less than 5 atomic %. The Fe content is preferably 15 atomic % or less, and more preferably 10 atomic % or less. The lower limit of the impurity content is not restricted and may be set to 0%, as less is preferable.

The film composition of the oxide film can be analyzed in the same way as the coating composition of the phosphate coating, by analyzing the composition of the cut surface using SEM-EDS or TEM-EDS. Details of the method for measuring film composition are described below.

Next, the thickness of the oxide film is described.

In the grain-oriented electrical steel sheet of the present embodiment, the average thickness of the oxide film is 2 to 500 nm when viewed on a cutting plane where the cutting direction is parallel to the thickness direction.

If the average thickness of the oxide film is less than 2 nm, the thermal stress relaxation effect is not sufficiently expressed. Therefore, the average thickness of the oxide film is 2 nm or more, preferably 5 nm or more, and more preferably 10 nm or more.

On the other hand, if the average thickness of the oxide film exceeds 500 nm, the thickness becomes non-uniform, and defects such as voids or cracks tend to occur in the layer. Therefore, the average film thickness should be set to 500 nm or less. It is preferably 400 nm or less, more preferably 200 nm or less, 150 nm or less, or 100 nm or less.

The average thickness of the oxide film can be determined by linear analysis of the cut surface using SEM-EDS or TEM-EDS, as well as the coating composition of the phosphate coating. Details of the method for measuring the average film thickness are described below.

Next, the base material steel sheet of the grain-oriented electrical steel sheet will be described.

<Base Metal Steel Sheet>

The base metal steel sheet is the base material of the grain-oriented electrical steel sheet. There are no restrictions on the type of base metal steel sheet, and any known silicon steel sheet can be used. For example, the silicon content of the silicon steel sheet is preferably 0.80 to 7.0 mass %, and its crystallographic orientation is preferably controlled in the {110} <001> orientation (Goss orientation).

Here, the {110} <001> orientation means that the {110} plane of the crystal is parallel to the rolling plane and the <001> axis of the crystal is parallel to the rolling direction.

First, the suitable chemical composition of silicon steel sheet is described.

Since the chemical composition of silicon steel sheet is not directly related to the crystallization state of cristobalite-type aluminum phosphate in the phosphate coating, the chemical composition of the silicon steel sheet used as the base metal steel sheet is not particularly restricted in the grain-oriented electrical steel sheet for the present embodiment. However, the chemical composition of silicon steel sheets preferred as grain-oriented electrical steel sheets is described below. Hereafter, % in relation to the chemical composition of silicon steel sheet means mass percent.

The chemical composition of the silicon steel sheet includes basic elements, selective elements as required, with the balance being Fe and impurities.

Specifically, the chemical composition of silicon steel sheet preferably contains, by mass %:
Si: 0.80 to 7.0%,
Mn: 0 to 1.0%,
Cr: 0 to 0.30%,
Cu: 0 to 0.40%,
P: 0 to 0.50%,
Sn: 0 to 0.30%,
Sb: 0 to 0.30%,
Ni: 0 to 1.0%,
B: 0 to 0.008%,
V: 0 to 0.15%,
Nb: 0 to 0.20%,
Mo: 0 to 0.10%,
Ti: 0 to 0.015%,
Bi: 0 to 0.010%,
Al: 0 to 0.005%,
C: 0 to 0.005%,
N: 0 to 0.005%,
S: 0 to 0.005%, and
Se: 0 to 0.005%,
with the balance being Fe and impurities.

In the present embodiment, it is sufficient if the silicon steel sheet contains Si as a basic element (major alloying element).

Si: 0.80 to 7.0%

Si (silicon) is a chemical composition of silicon steel sheet that is effective in increasing electrical resistance and reducing iron loss. If the Si content exceeds 7.0%, the material may become easy to crack during cold rolling and difficult to roll. On the other hand, if the Si content is less than 0.80%, the electrical resistance may become small and the iron loss in the product may increase. Therefore, the silicon steel sheet should contain Si in a range from 0.80 to 7.0%. The lower limit Si content is more preferably 2.0%, and even more preferably 2.5%, or 2.8%; the upper limit of Si content is preferably 5.0%, and more preferably 3.5%.

In the present embodiment, the silicon steel sheet may contain impurities. The term "impurities" refers to those that are mixed in during the industrial manufacture of steel, from ores or scrap as raw materials, or from the manufacturing environment, etc.

In addition to the basic elements and impurities mentioned above, the silicon steel sheet may also contain selective elements. For example, instead of a part of the remaining Fe described above, one or more of the following may be contained as selective elements: Mn, Cr, Cu, P, Sn, Sb, Ni, B, V, Nb, Mo, Ti, Bi, Al, C, N, S, Se. These selective elements may be included according to their purpose. Therefore, there is no need to limit the lower limits of these selective elements, and the lower limits thereof may be 0%. Even if these selective elements are contained as impurities, the above effects are not impaired.

Mn: 0 to 1.0%

Mn (manganese), like Si, is an effective element in reducing iron loss by increasing electrical resistance. It also combines with S or Se to function as an inhibitor. Therefore, Mn may be contained in a range of 1.0% or less. The lower limit of the Mn content is preferably 0.05%, more preferably 0.08%, and even more preferably 0.09%; the upper limit of the Mn content is preferably 0.50%, and more preferably 0.20%.

Cr: 0 to 0.30%

Cr (chromium), like Si, is an effective element in reducing iron loss by increasing electrical resistance. Therefore, Cr may be contained in a range of 0.30% or less. The lower limit of the Cr content is preferably 0.02%, and more preferably 0.05%; the upper limit of the Cr content is preferably 0.20%, and more preferably 0.12%.

Cu: 0 to 0.40%

Cu (copper) is another element effective in reducing iron loss by increasing electrical resistance. Therefore, Cu may be contained in a range of 0.40% or less. If the Cu content exceeds 0.40%, the effect of iron loss reduction becomes saturated and may cause surface defects (so-called "copper scab") during hot rolling. The lower limit of Cu content is preferably 0.05% and more preferably 0.10%. The upper limit of Cu content is preferably 0.30%, and more preferably 0.20%.

P: 0 to 0.50%

P (phosphorus) is also an effective element for reducing iron loss by increasing electrical resistance. Therefore, P may be contained in a range of 0.50% or less. If the P content exceeds 0.50%, rolling properties of silicon steel sheets may be problematic. The lower limit of the P content is preferably 0.005%, and more preferably 0.01%; the upper limit of the P content is preferably 0.30% or 0.20%, and more preferably 0.15%.

Sn: 0 to 0.30%

Sb: 0 to 0.30%

Sn (tin) and Sb (antimony) are effective elements for stabilizing secondary recrystallization and developing {110} <001> orientation. Therefore, Sn and Sb may be contained in a range of 0.30% or less, respectively. If the content of Sn or Sb exceeds 0.30%, respectively, the magnetic properties may be adversely affected.

The lower limit of the Sn content is preferably 0.02%, and more preferably 0.05%; the upper limit of the Sn content is preferably 0.15%, and more preferably 0.10%. The lower limit of the Sb content is preferably 0.01%, and more preferably 0.03%; the upper limit of the Sb content is preferably 0.15%, and more preferably 0.10%.

Ni: 0 to 1.0%

Ni (nickel) is also an element effective for reducing iron loss by increasing electrical resistance. Ni is also an effective element in controlling the metallurgical structure of hot-rolled sheets and enhancing magnetic properties. Therefore, Ni may be contained in a range of 1.0% or less. The Ni content exceeding 1.0% may cause instability of secondary recrystallization. The lower limit of the Ni content is preferably 0.01%, and more preferably 0.02%; the upper limit of the Ni content is preferably 0.50% or 0.20%, and more preferably 0.10%.

B: 0 to 0.008%

B (boron) is an effective element for exhibiting inhibitor effect as BN. Therefore, B may be contained in a range of 0.008% or less. The B content exceeding 0.008% may adversely affect magnetic properties. The lower limit of the B content is preferably 0.0005%, and more preferably 0.001%; the upper limit of the B content is preferably 0.005%, and more preferably 0.003%.

V: 0 to 0.15%
Nb: 0 to 0.20%
Ti: 0 to 0.015%

V (vanadium), Nb (niobium), and Ti (titanium) are elements effective in combining with N or C to function as inhibitors. Therefore, V may be contained in a range of 0.15% or less, Nb in a range of 0.20% or less, and Ti in a range of 0.015% or less. If these elements remain in the final product (electrical steel sheet) and the V content exceeds 0.15%, the Nb content exceeds 0.20%, or the Ti content exceeds 0.015%, the magnetic properties may be reduced.

The lower limit of the V content is preferably 0.002%, and more preferably 0.01%; the upper limit of the V content is preferably 0.10% or less, and more preferably 0.05%. The lower limit of the Nb content is preferably 0.005%, and more preferably 0.02%; the upper limit of the Nb content is preferably 0.10%, and more preferably 0.08%. The lower limit of the Ti content is preferably 0.002%, and more preferably 0.004%; the upper limit of the Ti content is preferably 0.010%, and more preferably 0.008%.

Mo: 0 to 0.10%

Mo (molybdenum) is also an effective element in reducing iron loss by increasing electrical resistance. Therefore, Mo may be contained in a range of 0.10% or less. If the Mo content exceeds 0.10%, problems may occur in the rollability of steel sheets. The lower limit of the Mo content is preferably 0.005%, and more preferably 0.01%; the upper limit of the Mo content is preferably 0.08%, and more preferably 0.05%.

Bi: 0 to 0.010%

Bi (bismuth) is an effective element for stabilizing precipitates such as sulfides and enhancing their function as inhibitors. Therefore, Bi may be contained in a range of 0.010% or less. If the Bi content exceeds 0.010%, the magnetic properties may be adversely affected. The lower limit of the Bi content is preferably 0.001%, and more preferably 0.002%; the upper limit of the Bi content is preferably 0.008%, and more preferably 0.006%.

Al: 0 to 0.005%

Al (aluminum) is an effective element for combining with N to function as an inhibitor. Therefore, Al may be included in a range of 0.01 to 0.065% before final annealing, for example, at the slab stage. However, if Al remains as impurities in the final product (electrical steel sheet) and the Al content exceeds 0.005%, the magnetic properties may be adversely affected. Therefore, it is preferable that the Al content of the final product be 0.005% or less. The upper limit of the Al content in the final product is preferably 0.004%, and more preferably 0.003%. Al in the final product is an impurity, and the lower limit is not restricted, and the lower the lower limit, the more desirable. However, since it is not easy industrially to reduce the Al content of the final product to 0%, the lower limit of the Al content of the final product may be 0.0005%. The Al content means the acid soluble Al content.

C: 0 to 0.005%
N: 0 to 0.005%

C (carbon) is an effective element in enhancing magnetic properties by adjusting the primary recrystallization texture. N (nitrogen) is also an effective element in combining with Al, B, etc. to produce an inhibitor effect. Therefore, C may be included in a range of 0.020 to 0.10% before decarburizing and annealing, for example, at the slab stage. N may be included in a range of 0.01 to 0.05% before final annealing, for example, at the stage after nitriding annealing. However, if these elements remain as impurities in the final product and exceed 0.005% each of C and N, the magnetic properties may be adversely affected.

Therefore, it is preferable that C and N in the final product be 0.005% or less, respectively. The C and N content of the final product is preferably 0.004% or less, and more preferably 0.003% or less, respectively. The total content of C and N in the final product is preferably 0.005% or less. C and N in the final product are impurities, and their contents are not limited particularly, and the lower the content, the more desirable. However, since it is not easy industrially to reduce the contents of C and N in the final product to 0% each, the contents of C and N in the final product may be 0.0005% or more, respectively.

S: 0 to 0.005%
Se: 0 to 0.005%

S (sulfur) and Se (selenium) are effective elements in combining with Mn and other elements to produce an inhibitor effect. Therefore, S and Se may be included in a range of 0.005 to 0.050%, respectively before final annealing, for example, at the slab stage. However, if these elements remain as impurities in the final product and the content of S or Se exceeds 0.005%, they may adversely affect the magnetic properties. Therefore, it is preferable that S and Se in the final product be 0.005% or less, respectively. The contents of S and Se in the final product is preferably 0.004% or less, and more preferably 0.003% or less, respectively. The total content of S and Se in the final product is preferably 0.005% or less. S and Se in the final product are impurities, and their content is not limited, and the lower the contents, the more preferable. However, since it is not easy industrially to reduce the content of S and Se in the final product to 0% respectively, the contents of S and Se in the final product may be 0.0005% or more, respectively.

In the grain-oriented electrical steel sheet according to the present embodiment may include, by mass %, at least one element selected from a group consisting of Mn: 0.05 to 1.0%, Cr: 0.02 to 0.30%, Cu: 0.05 to 0.40%, P: 0.005 to 0.50%, Sn: 0.02 to 0.30%, Sb: 0.01 to 0.30%, Ni: 0.01 to 1.0%, B: 0.0005 to 0.008%, V: 0.002 to 0.15%, Nb: 0.005 to 0.20%, Mo: 0.005 to 0.10%, Ti: 0.002 to 0.015%, and Bi: 0.001 to 0.010%.

The chemical composition of the silicon steel sheet may be measured by general analytical methods. Details of the chemical composition measurement method are described below.

Next, other characteristics of the silicon steel sheet will be described.

In the grain-oriented electrical steel sheet according to the present embodiment, it is preferable that the silicon steel sheet have a texture developed in the {110} <001> orientation. The magnetic properties are favorably improved when the silicon steel sheet is controlled in the Goss orientation.

The thickness of the silicon steel sheet is not limited particularly, but in order to further reduce iron loss, an average thickness of 0.35 mm or less is preferred, and 0.30 mm or less is more preferred. The lower limit of the thickness of the silicon steel sheet is not particularly restricted, but may be 0.10 mm from the viewpoint of manufacturing facilities and cost constraints.

It is preferable that the surface roughness of the silicon steel sheet (roughness of the interface between the intermediate layer and the base metal steel sheet) be smooth. For example, the surface roughness of the silicon steel sheet is preferably 0.5 μm or less, in terms of arithmetic mean roughness (Ra), and more preferably 0.3 μm or less. The lower limit of the arithmetic mean roughness (Ra) of the base metal steel sheet is not restricted, but the lower limit may be 0.1 μm because the iron loss improvement effect becomes saturated at 0.1 μm or less.

The grain-oriented electrical steel sheet of the present embodiment has excellent coating adhesion even without forsterite film due to the above characteristics. Therefore, iron loss characteristics are favorably improved.

The following is a detailed description of the measurement method for each of the above-mentioned characteristics of the grain-oriented electrical steel sheet.

<Measurement Method>

First, the layer structure of the grain-oriented electrical steel sheet described above can be identified, for example, by the following method.

A test specimen is cut from a grain-oriented electrical steel sheet and the layer structure of the specimen is observed with a scanning electron microscope (SEM) or transmission electron microscope (TEM). For example, layers with a thickness of 300 nm or more is can be observed by SEM, and layers with a thickness of less than 300 nm can be observed by TEM.

Specifically, first, a specimen is cut so that the cutting direction is parallel to the thickness direction (in detail, the specimen is cut so that the cutting plane is parallel to the thickness direction and perpendicular to the rolling direction), and the cross-sectional structure of the cutting plane is observed by SEM at a magnification that allows each layer to be included in the observation field. For example, by observing the cross-sectional structure in a backscattered electron composition image (COMPO image), it is possible to analogize how many layers the cross-sectional structure is composed of. For example, in the COMPO image, the base metal steel sheet can be identified as a light color, the intermediate layer as a dark color, and the insulation coating as an intermediate color.

To identify each layer in the cross-sectional structure, quantitative analysis of the chemical composition of each layer is performed by line analysis along the thickness direction using SEM-EDS. For example, the five elements to be quantitatively analyzed are Fe, P, Si, O, and Mg. The equipment used is not limited, but for example, SEM (NB5000 from Hitachi High-Technologies), EDS (XFlash®6I30 from Bruker AXS), and EDS analysis software (ESPRIT 1.9 from Bruker AXS) can be used.

Based on the observation results of the COMPO image and the quantitative analysis results of SEM-EDS described above, a layered region that exists at the deepest position in the plate thickness direction, where the Fe content is 80 atomic % or more and the O content is less than 30 atomic %, excluding measurement noise, and where the If the line segment (thickness) on the scanning line of the line analysis corresponding to this region is 300 nm or more, this region is judged to be the base metal steel sheet, and the regions excluding the base metal steel sheet are judged to be the intermediate layer or the insulation coating.

Based on the observation results of the COMPO image and the quantitative analysis results of SEM-EDS for the area excluding the base metal steel sheet identified above, if, excluding measurement noise, the Fe content is less than 80 atomic %, the P content is 5 atomic % or more, the Si content is 5 atomic % or more, and the O content is 30 atomic % or more, and if the line segment (thickness) on the scanning line of the line analysis corresponding to this region is 300 nm or more, this region is judged to be a phosphate coating. In addition to the above four elements, which are the judgment elements for identifying phosphate coating, the phosphate coating may also contain the above selective elements such as Al, Mg, Ni, Mn, etc., derived from phosphates.

In judging the areas of the phosphate coating above, precipitates, inclusions, and vacancies in the coating are not included in the judgment, and the areas that satisfy the above quantitative analysis results as the matrix phase are judged to be the phosphate coating. For example, if precipitates, inclusions, and vacancies are confirmed to exist on the scanning line of the linear analysis from the COMPO image or the linear analysis results, the area is judged as the matrix phase by the quantitative analysis results, excluding this area. Precipitates, inclusions, and vacancies can be distinguished from the matrix phase by contrast in the COMPO image, and by the amount of constituent elements in the quantitative analysis results. When identifying the phosphate coating, it is preferable to identify the phosphate coating at a location where precipitates, inclusions, and vacancies are not included on the scanning line of the linear analysis.

If the area excluding the base metal steel sheet and phosphate coating identified above and the line segment (thickness) on the scanning line of the line analysis corresponding to this area is 300 nm or more, this area is determined to be the intermediate layer.

The intermediate layer should satisfy the following conditions: Fe content less than 80 atomic %, P content 5 atomic % or less, Si content 20 atomic % or more, and O content 30 atomic % or more. If the intermediate layer is not a forsterite film but an oxide film mainly composed of silicon oxide, the Mg content of the intermediate layer should be 20 atomic % or less. The quantitative analysis result of the intermediate layer is the result of quantitative analysis as the matrix phase, which does not include the analysis results of precipitates, inclusions, and vacancies in the intermediate layer. When identifying the intermediate layer, it is preferable to identify it at a position where precipitates, inclusions, and vacancies are not included on the scanning line of the linear analysis.

The above COMPO image observation and SEM-EDS quantitative analysis are performed to identify each layer and measure the thickness at five or more locations by changing the observation field of view. The average value of the thickness of each layer obtained at five or more locations is obtained by excluding the maximum and minimum values, and this average value is used as the average coating or film thickness of each layer.

If there is a layer with a line segment (thickness) of less than 300 nm on the scanning line of line analysis in at least one of the five or more observation fields mentioned above, the corresponding layer is observed in detail using TEM, and the corresponding layer is identified and its thickness is measured using TEM.

The specimen containing the layer to be observed in detail using TEM is cut by FIB (Focused Ion Beam) processing so that the cutting direction is parallel to the plate thickness direction (in detail, the specimen is cut so that the cutting plane is parallel to the plate thickness direction and perpendicular to the rolling direction), and the cross-sectional structure of this cutting plane is measured by TEM. The cross-sectional structure of the cut surface is observed (bright field image) by STEM (Scanning-TEM) at a magnification that includes the relevant layers in the field of view. If each layer is not included in the field of view, the cross-sectional structure is observed in multiple consecutive fields of view.

To identify each layer in the cross-sectional structure, a quantitative analysis of the chemical composition of each layer is performed by line analysis along the thickness direction using TEM-EDS. The five elements to be quantitatively analyzed are Fe, P, Si, O, and Mg. The equipment used is not limited, but for example, TEM (JEOL's JEM-2100F), EDS (JEOL's JED-2300T), and EDS analysis software (JEOL's Analysis Station) can be used.

From the results of bright-field image observation by TEM and quantitative analysis by TEM-EDS described above, each layer is identified and the average coating or film thickness of each layer is measured. The method of identifying each layer using TEM and the method of measuring the average thickness of each layer can be performed by a method according to the method using SEM described above.

When the thickness of each layer identified by TEM is 5 nm or less, it is preferable to use a TEM with a spherical aberration correction function from the viewpoint of spatial resolution. When the thickness of each layer is 5 nm or less, a point analysis may be performed at intervals of 2 nm or less, for example, along the thickness direction to measure the line segment (coating or film thickness) of each layer, and this line segment may be adopted as the thickness of each layer. For example, if a TEM with a spherical aberration correction function is used, EDS analysis can be performed with a spatial resolution of about 0.2 nm.

In the grain-oriented electrical steel sheet of the present embodiment, the oxide film exists in contact with the base metal steel sheet and the phosphate coating exists in contact with the oxide film, so when each layer is identified by the above judgment criteria, there are no layers other than the base metal steel sheet, oxide film, and phosphate coating.

The coating composition of the phosphate coating and oxide film can be analyzed in detail by quantitative analysis using SEM-EDS or TEM-EDS within the region of the phosphate coating and oxide film identified above. This quantitative analysis can be performed by line or point analysis at multiple locations within the area of interest. In the quantitative analysis of the coating composition, the elements to be quantitatively analyzed need not to be restricted to the five elements of Fe, P, Si, O, and Mg, but other elements may be included in the quantitatively analysis.

Next, the crystallization state of cristobalite-type aluminum phosphate in the phosphate coating and the peak intensities of cristobalite-type aluminum phosphate and tridymite-type aluminum phosphate can be confirmed by grazing incidence X-ray diffraction using a Co-Kα excitation source.

For example, grazing incidence X-ray diffraction can be performed using a Co-Kα excitation source with X-ray incidence angles ω of 0.5° and 1.0° and a slit width of 1.0 mm. Check whether the obtained X-ray diffraction pattern has a diffraction peak at a diffraction angle of $2\theta=24.8°$ or not, and determine the half value width of this diffraction peak.

In addition, determine the peak intensity of the diffraction peak appearing at diffraction angle $2\theta=24.8°$ and the diffraction peak appearing at diffraction angle $2\theta=$ of $34.3°$ respectively from the obtained X-ray diffraction pattern. The peak intensity shall mean the measured intensity minus the background intensity. The equipment to be used is not limited in particular, but an X-ray diffractometer SmartLab manufactured by Rigaku Corporation, for example, can be used.

Next, the chemical composition of the silicon steel sheet described above can be observed, for example, by the following methods.

For example, the chemical composition can be measured using ICP-AES (Inductively Coupled Plasma-Atomic Emission Spectrometry). C and S can be measured using the combustion-infrared absorption method, N can be measured using the inert gas fusion-thermal conductivity method, and O can be measured using the inert gas fusion-non-dispersive infrared absorption method.

If the grain-oriented electrical steel sheet as a test piece has oxide film and phosphate coating on the surface, these coating and film should be removed by the following method before measuring the chemical composition.

For example, a grain-oriented electrical steel sheet with a coating can be immersed in a high-temperature alkaline solution. Specifically, the coating (oxide film and phosphate coating) on the silicon steel sheet can be removed by immersing the sheet in a sodium hydroxide solution of NaOH: 20 mass %+$H_2O$: 80 mass % at 80° C. for 20 minutes, followed by water rinsing and drying. The immersion time in the above sodium hydroxide solution should be changed depending on the thickness of the coating on the silicon steel sheet.

The texture of the silicon steel sheet can be measured by general analytical methods. For example, it can be measured by an X-ray diffraction method (Laue method). In the Laue method, an X-ray beam is perpendicularly irradiated onto a steel sheet, and the transmitted or reflected diffraction spots are analyzed. By analyzing the diffraction spots, the crystal orientation of the location where the X-ray beam was irradiated can be identified. If diffraction spots are analyzed at multiple irradiation positions, the crystal orientation distribution at each irradiation position can be measured. The Laue method is a suitable technique for measuring the crystal orientation of metallic structures with coarse crystal grains.

The surface roughness of the silicon steel sheet (roughness of the interface between the intermediate layer and the base metal steel sheet) can be measured using a contact-type surface roughness measuring instrument or a non-contact type laser surface roughness measuring instrument. If the silicon steel sheet has oxide film and phosphate coating on its surface, these coating and film need to be removed by the method described above before measuring the surface roughness.

Next, the method of manufacturing the grain-oriented electrical steel sheet is described.

<Manufacturing Method>

Figure 3:
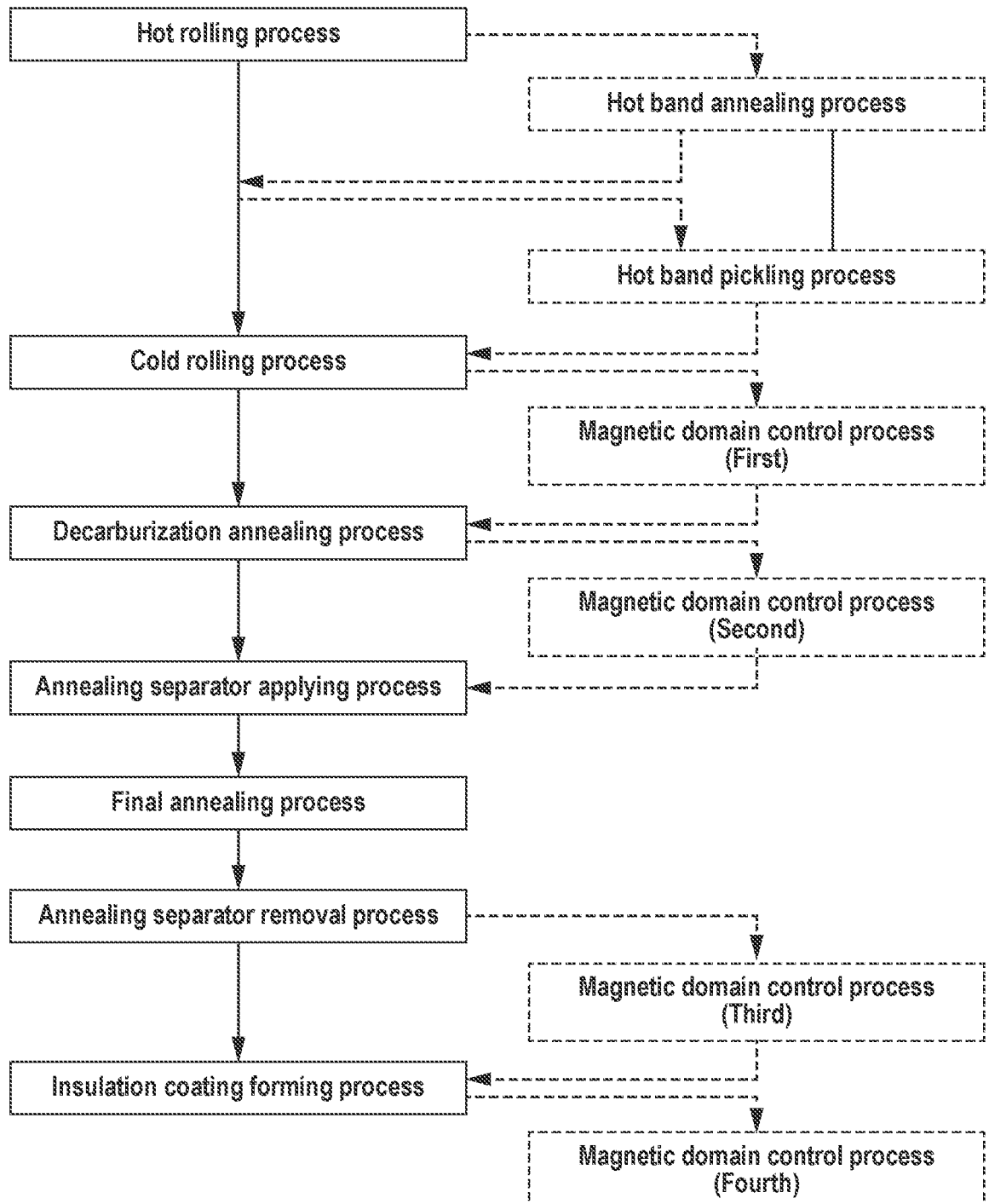
FIG. 3 is a flowchart showing a manufacturing method for a grain-oriented electrical steel sheet in accordance with an embodiment of the present invention.

FIG. 3 is a flowchart showing the manufacturing method for the grain-oriented electrical steel sheets according to an embodiment of the invention. In FIG. 3, the processes surrounded by solid lines indicate mandatory processes, while the processes surrounded by dashed lines indicate optional processes.

The method of manufacturing grain-oriented electrical steel sheets is not limited to the following method. The following manufacturing method is an example for manufacturing the grain-oriented electrical steel sheets of the present embodiment.

A manufacturing method for the grain-oriented electrical steel sheet according to the present embodiment is a manufacturing for a grain-oriented electrical steel sheet without forsterite film, and includes the following processes:

(i) a hot rolling process to obtain a hot-rolled steel sheet by hot rolling a steel slab having a predetermined chemical composition, (ii) a cold rolling process, in which the above hot-rolled steel sheet is cold rolled once, or twice or more with intermediate annealing between the two processes to obtain a cold-rolled steel sheet, (iii) a decarburization annealing process, wherein the above cold-rolled steel sheet is subjected to decarburization annealing to obtain a decarburization-annealed sheet, (iv) an annealing separator applying process in which the above decarburization-annealed sheet is coated with an annealing separator containing $Al_2O_3$ and MgO, and bake-dried, (v) a final annealing process to obtain a final sheet by annealing the above sheet coated with an annealing separator, (vi) an annealing separator removal process for removing excess annealing separator from the surface of the above final annealed sheet by a method including either or both of water rinsing or pickling, and (vii) an insulation coating forming process in which an insulation coating is formed on the surface of the above final annealed sheet.

The manufacturing method for the grain-oriented electrical steel sheets according to the present embodiment may further includes the following processes:

(I) a hot band annealing process to anneal a hot-rolled steel sheet, (II) a hot band pickling process for pickling the hot-rolled steel sheet, or (III) a magnetic domain control process, in which magnetic domain control treatment is performed.

Each process is described in detail below.

<Hot Rolling Process>

In the hot rolling process, a slab having a chemical composition including, by mass %:

C: 0.020 to 0.10%,
Si: 0.80 to 7.0%,
Mn: 0.05 to 0 1.0%,
Total of S+Se: 0 to 0.050%,
Acid soluble Al: 0.010 to 0.065%,
N: 0.004 to 0.012%,
Cr: 0 to 0.30%,
Cu: 0 to 0.40%,
P: 0 to 0.50%,
Sn: 0 to 0.30%,
Sb: 0 to 0.30%,
Ni: 0 to 1.0%,
B: 0 to 0.008%,
V: 0 to 0.15%,
Nb: 0 to 0.20%,
Mo: 0 to 0.10%,
Ti: 0 to 0.015%, and
Bi: 0 to 0.010%,
with the balance being Fe and impurities
is hot rolled to obtain a hot rolled steel sheet. In the present embodiment, a steel sheet after the hot-rolling process is called a hot-rolled steel sheet.

There is no limitation on the manufacturing method for steel pieces (slabs) to be used in the hot rolling process. For example, molten steel with a predetermined chemical composition can be melted and the molten steel can be used to produce slabs. The slab may be produced by the continuous casting method, or ingots may be made from the molten steel, and the ingots may be bloom-rolled to produce slabs. The slab may also be produced by other methods.

The thickness of the slab is not particularly limited, but is, for example, 150 to 350 mm. The thickness of the slab is preferably 220 to 280 mm. So-called thin slabs with a thickness of 10 to 70 mm may be used as slabs.

First, the reasons for limiting the chemical composition of the slab are described. Hereafter, "%" with respect to chemical composition means mass percent.

C: 0.020 to 0.10%

C (carbon) is an element that is effective in controlling the primary recrystallized texture, but has an adverse effect on magnetic properties, so it is an element that is removed by decarburization annealing before final annealing. If the C content of the slab exceeds 0.10%, the decarburization annealing time becomes longer, resulting in lower productivity. Therefore, the C content is 0.10% or less. Preferably, it is 0.085% or less, and more preferably 0.070% or less.

Although lower C content is preferable, the practical lower limit of C content is 0.020% when considering productivity in industrial production and magnetic properties of the product.

Si: 0.80 to 7.0%

Silicon (Si) increases the electrical resistance of grain-oriented electrical steel sheets and reduces iron loss. If the Si content is less than 0.80%, γ transformation occurs during final annealing and the crystal orientation of the grain-oriented electrical steel sheet is impaired. Therefore, the Si content is 0.80% or more. The Si content is preferably 2.0% or more, and more preferably 2.50% or more.

On the other hand, if the Si content exceeds 7.0%, the cold workability is reduced, and cracking is likely to occur during cold rolling. Therefore, the Si content is 7.0% or less. The Si content is preferably 5.0% or less, and more preferably 3.5% or less.

Mn: 0.05% to 1.0%

Manganese (Mn) increases the electrical resistance of grain-oriented electrical steel sheets to reduce iron loss. Mn also combines with S or Se to form MnS or MnSe, which functions as an inhibitor. The secondary recrystallization is stable when the Mn content is in a range of 0.05% and 1.0%. Therefore, the Mn content is 0.05% or more and 1.0% or less. The lower limit of Mn content is more preferably 0.08%, and even more preferably 0.09%; the preferred upper limit of Mn content is more preferably 0.50%, and even more preferably 0.20%.

Total of Both S and Se or Either of S or Se: 0 to 0.050%

S (sulfur) and Se (selenium) are elements that combine with Mn to form MnS or MnSe, which act as inhibitors. If the sum of both S and Se (S+Se), or either of S or Se exceeds 0.050%, the precipitation dispersion of MnS and/or MnSe becomes uneven after hot rolling. In this case, the preferable secondary recrystallized texture cannot be obtained, resulting in lower magnetic flux density, or MnS remains in the steel after purification, resulting in hysteresis loss degradation. Therefore, the total content of S and Se should be 0.050% or less.

The lower limit of the total content of S and Se is not restricted and may be 0%. The lower limit may be set to 0.003% or 0.005%. When used as an inhibitor, it is preferably 0.015% or more.

Acid Soluble Al (Sol. Al): 0.010 to 0.065%

Acid soluble Al (Sol. Al) is an element that combines with N to form AlN or (Al,Si)N, which functions as an inhibitor. When the acid soluble Al is less than 0.010%, the effect is not fully exhibited, and secondary recrystallization does not progress sufficiently. Therefore, the acid soluble Al content should be 0.010% or more. The acid soluble Al content is preferably 0.015% or more, and more preferably 0.020% or more.

On the other hand, if the acid-soluble Al content exceeds 0.065%, the precipitation dispersion of AlN or (Al,Si)N becomes non-uniform, the required secondary recrystallized texture cannot be obtained, and the magnetic flux density decreases. Therefore, acid soluble Al (Sol. Al) should be 0.065% or less. The content of Sol. Al is preferably 0.055% or less, and more preferably 0.050% or less.

N: 0.004% to 0.012%

N (nitrogen) is an element that combines with Al to form AlN or (Al, Si)N, which functions as an inhibitor. If the N content is less than 0.004%, the formation of AlN or (Al, Si)N is insufficient. Therefore, the N content should be 0.004% or more. The N content is preferably 0.006% or more, and more preferably 0.007% or more.

On the other hand, if the N content exceeds 0.012%, there is concern that blisters (vacancies) may be formed in the steel sheet. Therefore, the N content should be 0.012% or less.

The chemical composition of the above slab contains the above elements, with the balance being Fe and impurities. However, one or more of the selective elements may be contained in the following ranges instead of a part of Fe, considering the enhancement of inhibitor function by compound formation and the effect on magnetic properties. The selective elements contained instead of a part of Fe are, for example, Cr, Cu, P, Sn, Sb, Ni, B, V, Nb, Mo, Ti, and Bi. However, since the selective elements need not be included, all of their lower limits are 0%. Even if these selective elements are contained as impurities, the above effects are not impaired. The term "impurities" refers to those that are mixed in during the industrial manufacture of steel, either from ores or scrap as raw materials or from the manufacturing environment, etc.

Cr: 0 to 0.30%
Cu: 0 to 0.40%
P: 0 to 0.50%
Sn: 0 to 0.30%
Sb: 0 to 0.30%
Ni: 0 to 1.0%
B: 0 to 0.008%
V: 0 to 0.15%
Nb: 0 to 0.20%
Mo: 0 to 0.10%
Ti: 0 to 0.015%
Bi: 0 to 0.010%

These selective elements may be included for known purposes. There is no need to set lower limits for the contents of these selective elements, and their lower limits may be 0%.

Then, the conditions for hot rolling the above slabs are then described. There are no particular limitations on the hot rolling conditions. For example, the following conditions are used. The slab is heated prior to hot rolling. The slab is charged into a well-known heating furnace or a well-known soaking furnace and heated; one method is to heat the slab to 1280° C. or less. By setting the heating temperature of the slab to 1280° C. or lower, various problems caused when the slab is heated to a temperature higher than 1280° C. (for example, need for a dedicated heating furnace, a large amount of molten scale etc.) can be avoided. The lower limit of the heating temperature of the slab is not particularly limited. If the heating temperature is too low, hot rolling may become difficult and productivity may decrease. Therefore, the heating temperature should be set in the range of 1280° C. or lower, taking productivity into consideration. The preferred lower limit of the heating temperature of the slab is 1100° C.; the preferred upper limit for the heating temperature of the slab is 1250° C.

Alternatively, the slab is heated to a higher temperature than 1320° C. By heating the slab to 1320° C. or higher, AlN and Mn(S,Se) are dissolved and micro-precipitated in the subsequent process, thus enabling stable secondary recrystallization to occur. It is also possible to omit the slab heating process itself and start hot rolling after casting before the slab temperature drops.

Next, hot rolling is performed on the heated slab using a hot rolling mill to produce hot-rolled steel sheets. The hot rolling mill consists, for example, of a roughing mill and a finishing mill located downstream of the roughing mill. The roughing mill is equipped with a row of roughing stands. Each roughing stand includes a plurality of rolls arranged above and below. The finishing mill is similarly equipped with a row of finishing stands. Each finishing rolling stand includes a plurality of rolls arranged above and below. After heated steel is rolled by the roughing mill, it is further rolled by the finishing mill to produce hot-rolled steel sheets. The finishing temperature in the hot rolling process (the temperature of the steel sheet on the exit side of the finishing stand, where the steel sheet is last pressed down in the finishing mill) is, for example, 700 to 1150° C. The above hot rolling process is used to produce hot-rolled steel sheets.

<Hot Band Annealing Process>

In the hot band annealing process, the hot-rolled steel sheet obtained in the hot rolling process is annealed (hot band annealing) to obtain a hot band annealed sheet, if necessary. In the present embodiment, the steel sheet after the hot band annealing process is called a hot band annealed sheet.

Hot band annealing is performed to homogenize as much as possible the inhomogeneous microstructure created during hot rolling, in order to control the precipitation of inhibitor AlN (micro-precipitation) and control the second phase/solute carbon, and so on. For annealing conditions, known conditions can be selected depending on the purpose. For example, to homogenize the non-uniform microstructure created during hot rolling, the hot-rolled steel sheet is held at an annealing temperature (furnace temperature in a hot band annealing furnace) of 750 to 1200° C. for 30 to 600 seconds. Hot band annealing does not necessarily have to be carried out, and whether or not the hot band annealing process is performed depends on the characteristics required of the final product of the grain-oriented electrical steel sheet and the production cost.

<Hot Band Pickling Process>

In the hot band pickling process, hot-rolled steel sheets after the hot rolling process, or hot band annealed sheets after the hot band annealing process in the case of hot band annealed sheets, are pickled as necessary to remove scale formed on the surface. Pickling conditions are not limited particularly and can be performed under known conditions.

<Cold Rolling Process>

In the cold rolling process, hot-rolled or hot band annealed sheets are cold rolled once, or twice or more with intermediate annealing to make cold-rolled steel sheets after the hot rolling process, hot band annealing process, or the pickling process after hot-rolling or hot band annealing. In the present embodiment, a steel sheet after the cold rolling process is called a cold-rolled steel sheet.

The suitable cold rolling reduction ratio in the final cold rolling (cumulative cold rolling reduction ratio without intermediate annealing or after intermediate annealing) is preferably 80% or more, and more preferably 90% or more. The preferred upper limit of the final cold rolling reduction ratio is 95%.

The final cold rolling reduction ratio (%) is defined as follows:

final cold rolling reduction ratio (%)=(1−thickness of steel sheet after final cold rolling/thickness of steel sheet before final cold rolling)×100.

<Decarburization Annealing Process>

In the decarburization annealing process, the cold-rolled steel sheet produced by the cold rolling process is subjected to magnetic domain control treatment as necessary, and then subjected to decarburization annealing for primary recrystallization. In the decarburization annealing process, C, which adversely affects magnetic properties, is removed from the steel sheet. In the present embodiment, the steel sheet after the decarburization annealing process is called a decarburization-annealed sheet.

For the above purpose, in decarburization annealing, the steel sheet should be held in an annealing atmosphere (furnace atmosphere) of an oxidation degree ($PH_2O/PH_2$) of 0.01 to 0.15, at an annealing temperature of 750 to 900° C., for 10 to 600 seconds. The oxidation degree, $PH_2O/PH_2$, can be defined by the ratio of the water vapor partial pressure $PH_2O$ (atm) to the hydrogen partial pressure $PH_2$ (atm) in the atmosphere.

If the oxidation degree ($PH_2O/PH_2$) is less than 0.01, not only does the decarburization rate slow down and productivity decreases, but also poor decarburization occurs and the magnetic properties after final annealing deteriorate. On the other hand, if it exceeds 0.15, Fe-based oxides are formed, making it difficult to smooth the interface after final annealing.

If the annealing temperature is less than 750° C., the decarburization rate is slow and productivity is reduced, as well as decarburization defects occur and the magnetism after final annealing deteriorates. On the other hand, if the annealing temperature is above 900° C., the primary recrystallized grain size exceeds the desired size, resulting in deterioration of magnetism after final annealing. Furthermore, if the holding time is less than 10 seconds, decarburization cannot be sufficiently performed. On the other hand, if the holding time is longer than 600 seconds, productivity is reduced and the primary recrystallized grain size exceeds the desired size, resulting in degradation of magnetism after final annealing.

The heating rate in the process of raising the temperature to the annealing temperature may be controlled depending on the above oxidation degree ($PH_2O/PH_2$). For example, when heating including induction heating is used, the average heating rate should be 5 to 1000° C./sec. In the case of heating including current heating, the average heating rate should be 5 to 3000° C./sec.

In the decarburization annealing process, the decarburization annealing process may also include nitriding, in which cold-rolled steel sheets are nitrided by annealing in an atmosphere containing ammonia at one or more of the stages before, during, or after the above holding. When the slab heating temperature is low, it is preferable that the decarburization annealing process include nitriding. By further nitriding in the decarburization annealing process, inhibitors such as AlN or (Al, Si)N are formed before the secondary recrystallization in the final annealing process, thus enabling stable secondary recrystallization to occur.

Although there are no particular limitations on the conditions of nitriding treatment, it is preferable to perform nitriding so that the nitrogen content increases by 0.003% or more, preferably by 0.005% or more, and even more preferably by 0.007% or more. Since the effect becomes saturated when the nitrogen (N) content becomes 0.030% or more, nitriding treatment may be performed so that the nitrogen (N) content becomes 0.030% or less.

The conditions for nitriding treatment are not limited particularly and can be performed under known conditions. For example, when nitriding is performed after decarburization annealing with the oxidation degree ($PH_2O/PH_2$) of 0.01 to 0.15 and holding at 750 to 900° C. for 10 to 600 seconds, the cold-rolled steel sheet is not cooled to room temperature, but is held in an atmosphere containing ammonia during the temperature reduction process. The oxidation degree ($PH_2O/PH_2$) should be in a range of 0.0001 to 0.01 in the process of temperature reduction. When nitriding is performed during decarburization annealing and holding at the oxidation degree ($PH_2O/PH_2$) of 0.01 to 0.15 and 750 to 900° C. for 10 to 600 seconds, ammonia can be introduced into the atmosphere gas at this oxidation degree.

<Annealing Separator Application Process>

In the annealing separator application process, an annealing separator containing $Al_2O_3$ and MgO is applied to the decarburization-annealed sheet (including a nitrided decarburization-annealed sheet) after the decarburization annealing process, after performing magnetic domain control treatment if necessary, and the applied annealing separator is dried.

When the annealing separator contains MgO and does not contain $Al_2O_3$, a forsterite film is formed on the steel sheet in the final annealing process. On the other hand, if the annealing separator contains $Al_2O_3$ but no MgO, mullite ($3Al_2O_3 \cdot 2SiO_2$) is formed on the steel sheet. This mullite becomes an obstacle to magnetic wall movement and causes deterioration of the magnetic properties of the grain-oriented electrical steel sheet.

Therefore, in the manufacturing method for grain-oriented electrical steel sheets, an annealing separator containing $Al_2O_3$ and MgO is used as the annealing separator. By using the annealing separator containing $Al_2O_3$ and MgO, no forsterite film is formed on the surface after final annealing and a steel sheet with a smooth surface can be obtained.

The annealing separator should have a $MgO/(MgO+Al_2O_3)$ ratio of 5 to 50%, which is the mass ratio of MgO and $Al_2O_3$, and a hydration water content of 1.5 mass % or less. If $MgO/(MgO+Al_2O_3)$ is less than 5%, a large amount of mullite is formed and iron loss is degraded. On the other hand, if $MgO/(MgO+Al_2O_3)$ is more than 50%, forsterite is formed and iron loss is degraded.

If the hydration water content in the annealing separator exceeds 1.5 mass %, secondary recrystallization may become unstable or the steel sheet surface may become oxidized ($SiO_2$ formation) during final annealing, making it difficult to smooth the steel sheet surface. The lower limit of hydration water content is not particularly limited, but should be, for example, 0.1 mass %.

The annealing separator is applied to the steel sheet surface by water slurry application or electrostatic application. In the annealing separator application process, manganese nitride, iron nitride, chromium nitride, or other nitrides that decompose before secondary recrystallization in the final annealing process to nitride the decarburized or decarburized-and-nitrided steel sheet may be further added to the annealing separator.

<Final Annealing Process>

The decarburization-annealed sheet coated with the above annealing separator is subjected to final annealing to produce a final annealed sheet. By performing final annealing on the decarburization-annealed sheet coated with an annealing separator, secondary recrystallization progresses and the crystal orientation accumulates in the {110}<001> orientation. In the present embodiment, the steel sheet after the final annealing process is called a final annealed sheet.

When final annealing, if the atmosphere (furnace atmosphere) contains hydrogen, the oxidation degree ($PH_2O/PH_2$) should be 0.00010 to 0.2, and if the atmosphere consists of an inert gas (such as nitrogen or argon) that does not contain hydrogen, the dew point should be 0° C. or lower. By setting the dew point or the oxidation degree to the above range depending on the atmosphere, secondary recrystallization can be stably developed to increase the degree of orientation integration.

When the atmosphere contains hydrogen and the oxidation degree is less than 0.00010, the dense surface silica film formed by decarburization annealing is reduced before secondary recrystallization in the final annealing process, and secondary recrystallization becomes unstable. On the other hand, if the oxidation degree is more than 0.2, the decomposition of inhibitors such as AlN or (Al, Si)N is accelerated and the secondary recrystallization becomes unstable. When the atmosphere is an inert gas containing no hydrogen, if the dew point is above 0° C., the decomposition of inhibitors such as AlN or (Al, Si)N is accelerated and the secondary recrystallization becomes unstable. The lower limit of the dew point is not restricted, but should be −30° C., for example.

<Annealing Separator Removal Process>

In the annealing separator removal process, excess annealing separator such as unreacted annealing separator that did not react with the steel sheet in the final annealing process is removed from the surface of the steel sheet after final annealing (final annealed sheet) by a method including either one or both of water rinsing and pickling.

Insufficient removal of excess annealing separator from the surface of the steel sheet deteriorates the space factor, resulting in poor performance as an iron core.

In order to remove excess annealing separator, in addition to water rinsing and pickling, a scrubber may be used for further removal. The use of a scrubber ensures the removal of excess annealing separator that deteriorates wettability in the insulation coating formation process.

When pickling is used to remove excess annealing separator, pickling should be performed using an acidic solution with a volume-specific concentration of less than 20%. For example, a solution containing one or more of sulfuric acid, nitric acid, hydrochloric acid, phosphoric acid, chloric acid, chromic oxide aqueous solution, chromium sulfate, permanganic acid, peroxosulfuric acid, and peroxolinic acid, in total less than 20% by volume, is preferably used, more preferably less than 10 volume percent. The lower limit of the volume-specific concentration is not restricted, but should be, for example, 0.1 volume percent. By using such a solution, excess annealing separator on the steel sheet surface can be efficiently removed. The volume percentage should be a ratio based on the volume at room temperature.

When pickling is performed, it is preferable to set the solution temperature at 20 to 80° C. By setting the solution temperature in the above range, excess annealing separator on the steel sheet surface can be efficiently removed.

<Insulation Coating Formation Process>

In the insulation coating formation process, an insulation coating is formed on the surface of the finial annealed sheet after the annealing separator removal process, after performing magnetic domain control treatment as necessary. In the present embodiment, the steel sheet after the insulation coating formation process is called a grain-oriented electrical steel sheet.

This insulation coating reduces the iron loss of the steel sheet as a single sheet by imparting tension to the steel sheet, and also by ensuring electrical insulation between steel sheets when grain-oriented electrical steel sheets are stacked.

The insulation coating is formed by applying a coating solution consisting mainly of aluminum phosphate and colloidal silica and containing no chromate to the surface of the final annealed sheet, baking at 350 to 600° C., and then heat treating at a temperature of 800 to 1000° C.

As mentioned above, in the grain-oriented electrical steel sheet of the present embodiment, crystallization of aluminum phosphate is caused by condensation dehydration of the phosphate coating during the insulating coating formation process. The intermediate layer is then formed by water generated in this process.

In addition, the above coating solution includes preferably:
  100 parts by mass, in terms of solid content, of a first metal phosphate, which is a metal phosphate of one or more metals selected from Al, Fe, Mg, Mn, Ni, and Zn;
  0 to 20 parts by mass, in terms of solid content, as required, of a second metal phosphate which is a metal phosphate of one or more metals selected from Co, Mo, V, W, and Zr;
  35 to 125 parts by mass of colloidal silica in terms of solid content; and
  0.3 to 6.0 parts by mass of polymerization aid.

The coating solution preferably does not include chromate.

The average primary particle size of the above colloidal silica is preferably 7 to 30 nm.

It is also preferred that the above polymerization aid be selected from the group consisting of nitrous acid, sodium nitrite, potassium nitrite, nitric acid, sodium nitrate, potassium nitrate, chlorous acid, sodium chlorite, phosphonic acid, sodium phosphonate, triphosphoric acid, sodium triphosphate, polyphosphoric acid, and sodium polyphosphate.

It is also preferred that the above coating solution further contain one or more selected from the group consisting of boric acid, sodium borate, titanium oxide, molybdenum oxide, pigment, and barium titanate.

The final annealed sheet coated with the above coating solution is heated. In this process, it is important to control the heating rate from room temperature to 350° C. (average heating rate). The heating rate from room temperature to 350° C. should be 10° C./sec or more and less than 30° C./sec. Controlling the heating rate from room temperature to 350° C. corresponds to requirement (II) above.

When the heating rate from room temperature to 350° C. is less than 30° C./second, the crystallization state of cristobalite-type aluminum phosphate is controlled in both the topmost surface and interior regions of the phosphate coating. The reason why the above heating rate affects the crystallization state is not known in detail at the present time, but the following causes are possible. For example, if the heating rate from room temperature to 350° C. is less than 30° C./second, the temperature difference between the topmost surface region and the interior region of the coating solution before aluminum phosphate crystallization begins is small. As a result, when the coating solution is baked to form a phosphate coating, the temperature difference between the topmost surface region and the interior region of the phosphate coating will be small, and the crystallization state of cristobalite aluminum phosphate will be uniformly controlled.

It is further preferred that the upper limit of the heating rate from room temperature to 350° C. be 25° C./sec. On the other hand, the lower limit of the above heating rate is not restricted, and the lower the rate, the more desirable. However, since it is not industrially easy to keep the lower limit of the above heating rate close to 0, the lower limit of the above temperature increase rate may be 10° C./sec.

In the conventional manufacturing of grain-oriented electrical steel sheets, the heating rate from room temperature to 350° C. is generally controlled to 40° C./second or more when the final annealed sheet coated with the coating solution is heated. In the method of manufacturing the grain-oriented electrical steel sheet according to the present embodiment, the heating rate from room temperature to 350° C. is intentionally kept low and controlled to less than 30° C./sec in order to control the crystallization state of cristobalite-type aluminum phosphate in the phosphate coating in both the surface and interior regions of the phosphate coating.

After heating the final annealed sheet at the above heating rate, the coating solution is baked at 350 to 600° C. If the baking temperature of the insulation coating is less than 350° C., the insulation coating drips while the sheet is passed, causing poor appearance, and an insulation coating with sufficient adhesion cannot be obtained. If the temperature exceeds 600° C., the heating rate is too fast and hardening progresses only on the topmost surface of the insulation coating, delaying the hardening of the interior, causing coating formation defects and insufficient coating adhesion.

After the above baking, the steel sheet is heat-treated at a temperature of 800 to 1000° C. If the heat treatment temperature after baking is less than 800° C., coating formation is defective (insufficient hardening) and sufficient coating tension cannot be obtained. If the temperature exceeds 1000° C., decomposition of phosphate occurs, resulting in poor coating formation and insufficient coating adhesion.

When forming the coating, it is preferable to set the oxidation degree of the atmosphere ($PH_2O/PH_2$) to 0.01 to 1.5 to enable insulation coating formation without decomposing the phosphate more than necessary.

The coating solution for forming insulation coating can be applied to the steel sheet surface using a wet coating method such as a roll coater, for example.

<Magnetic Domain Control Process>

In the method of manufacturing grain-oriented electrical steel sheets according to the present embodiment, the magnetic domain control process for controlling the magnetic domain may be included: between the cold rolling process and the decarburization annealing process (1), between the decarburization annealing process and the annealing separator application process (2), between the annealing separator removal process and the insulation coating formation process (3), or after the insulation coating formation process (4).

The magnetic domain control treatment can further reduce the iron loss of the grain-oriented electrical steel sheet. When the magnetic domain control treatment is performed between the cold rolling process and the decarburization annealing process, between the decarburization annealing process and the annealing separator application process, or between the annealing separator removal process and the insulation coating formation process, the width of the 180° magnetic domain should be narrowed (subdividing the 180° magnetic domain) by forming grooves in the form of lines or dots at predetermined intervals along the rolling direction.

When the magnetic domain control treatment is performed after the insulation coating formation process, the width of the 180° magnetic domain can be narrowed (subdivided into 180° magnetic domains) by forming line-shaped or point-shaped stress-strain portions or grooves extending in the direction that intersects the rolling direction at predetermined intervals along the rolling direction.

In the case of forming stress-strain portions, laser beam irradiation, electron beam irradiation, etc. can be applied. To form grooves, mechanical grooving using toothed gears, chemical grooving using electrolytic etching, and thermal grooving using laser irradiation can be applied. If the formation of stress-strain areas or grooves causes damage to the insulation coating, resulting in deterioration of properties such as insulation, the damage may be repaired by forming the insulation coating again.

Example

Next, the effects of an embodiment of the present invention will be described in more concrete detail by means of examples. The conditions in the examples are examples of conditions adopted to confirm the feasibility and effects of the invention, and the invention is not limited to these examples of conditions. Various conditions may be employed in the present invention as long as they do not depart from the scope of the present invention and achieve the purpose thereof.

Steel slabs the chemical composition of which is adjusted so that the chemical composition of the silicon steel sheet is as shown in Table 1 is heated to 1150° C. and subjected to hot rolling to produce hot-rolled steel sheets of 2.6 mm thickness. The hot-rolled steel sheets were then annealed as necessary, and cold rolled once or multiple times with intermediate annealing in between to obtain a final sheet thickness of 0.22 mm. The cold-rolled steel sheets were decarburization annealed, and nitrided in an atmosphere containing ammonia during the process of temperature reduction. The known conditions were applied from slab heating to nitriding.

TABLE 1

| Chemical composition of base metal steel sheet (mass %), balance: Fe and impurities) | | | | | | | | | | | | | | | | | | | |
|---|---|---|---|---|---|---|---|---|---|---|---|---|---|---|---|---|---|---|---|
| Steel | Si | Mn | Cr | Cu | P | Sn | Sb | Ni | B | V | Nb | Mo | Ti | B | Al | C | N | S | Se |
| A | 3.3 | 0.1 | 0.1 | — | 0.03 | 0.05 | — | — | — | — | — | — | — | — | 0.001 | 0.001 | 0.001 | 0.001 | — |
| B | 2.7 | 0.2 | — | — | — | — | — | — | — | — | — | — | — | — | 0.001 | 0.001 | 0.001 | 0.001 | — |
| C | 3.8 | 0.1 | 0.1 | 0.2 | 0.02 | 0.08 | — | — | — | — | — | — | — | — | 0.001 | 0.001 | 0.001 | 0.001 | 0.001 |
| D | 3.3 | 0.5 | 0.1 | — | — | — | — | — | — | — | — | — | — | — | 0.001 | 0.001 | 0.001 | 0.001 | — |
| E | 3.3 | 0.1 | 0.2 | — | — | — | — | — | — | — | — | — | — | — | 0.001 | 0.001 | 0.001 | 0.001 | — |
| F | 3.3 | 0.1 | 0.1 | 0.3 | — | — | — | — | — | — | — | — | — | — | 0.001 | 0.001 | 0.001 | 0.001 | — |
| G | 3.3 | 0.1 | 0.1 | — | 0.2 | — | — | — | — | — | — | — | — | — | 0.001 | 0.001 | 0.001 | 0.001 | — |

TABLE 1-continued

Chemical composition of base metal steel sheet (mass %), balance: Fe and impurities

| Steel | Si | Mn | Cr | Cu | P | Sn | Sb | Ni | B | V | Nb | Mo | Ti | B | Al | C | N | S | Se |
|---|---|---|---|---|---|---|---|---|---|---|---|---|---|---|---|---|---|---|---|
| H | 3.3 | 0.1 | 0.1 | — | — | 0.1 | 0.1 | — | — | — | — | — | — | — | 0.001 | 0.001 | 0.001 | 0.001 | — |
| I | 3.4 | 0.1 | 0.1 | — | — | — | — | 0.3 | — | — | — | — | — | — | 0.001 | 0.001 | 0.001 | 0.001 | — |
| J | 3.3 | 0.1 | 0.1 | — | — | — | — | — | 0.001 | — | — | — | — | — | 0.001 | 0.001 | 0.001 | 0.001 | — |
| K | 3.3 | 0.1 | 0.1 | — | — | — | — | — | — | 0.002 | — | — | — | — | 0.001 | 0.001 | 0.001 | 0.001 | — |
| L | 3.3 | 0.1 | 0.1 | — | — | — | — | — | — | — | 0.002 | — | — | — | 0.001 | 0.001 | 0.001 | 0.001 | — |
| M | 3.3 | 0.1 | 0.1 | — | — | — | — | — | — | — | — | 0.05 | — | — | 0.001 | 0.001 | 0.001 | 0.001 | — |
| N | 3.3 | 0.1 | 0.1 | — | — | — | — | — | — | — | — | — | 0.003 | — | 0.001 | 0.001 | 0.001 | 0.001 | — |
| O | 3.3 | 0.1 | 0.1 | — | — | — | — | — | — | — | — | — | — | 0.001 | 0.001 | 0.001 | 0.001 | 0.001 | — |

* "—" in table indicates element which is no intentionally added.

The decarburization-annealed sheets after the decarburization annealing described above were coated with the annealing separator in which the ratio of $Al_2O_3$ to MgO ($MgO/(Al_2O_3+MgO)$) and hydration water content are the conditions shown in Tables 2 and 3. Final annealing was performed at 1200° C. for 20 hours on the decarburization-annealed sheet coated with the annealing separator.

Then, after removing excess annealing separator using a scrubber, a coating solution for forming an insulation coating with adjusted components was applied, and the temperature was raised; the sheets were subjected to baking and further heat treatment under the conditions shown in Tables 2 and 3 in order to form an insulation coating.

Magnetic domain control was also performed after the insulation coating formation process. In the magnetic domain control, a laser was used to form stress-strain areas or grooves.

TABLE 2

| | | Annealing sparator application | | Insulation coating formation | | | | |
|---|---|---|---|---|---|---|---|---|
| | | | | | Heating rate | | | |
| Test No. | Steel | MgO/ (MgO + $Al_2O_3$) (mass %) | Hydration water content (mass %) | Type of coating solution | from room temperature to 350° C. (° C./s) | Baking temperature (° C.) | Heat treatment temperature (° C.) | Oxidation degree of atmosphere $PH_2O/PH_3$ |
| 1 | A | 5 | 0.3 | Cr free | 20 | 450 | 870 | 0.06 |
| 2 | A | 30 | 0.3 | Cr free | 20 | 450 | 870 | 0.06 |
| 3 | A | 50 | 0.3 | Cr free | 20 | 450 | 870 | 0.06 |
| 4 | A | 48 | 1.5 | Cr free | 20 | 450 | 870 | 0.06 |
| 5 | A | 43 | 1.5 | Cr free | 20 | 450 | 870 | 0.06 |
| 6 | A | 40 | 0.1 | Cr free | 20 | 450 | 870 | 0.06 |
| 7 | A | 40 | 1.0 | Cr free | 20 | 450 | 870 | 0.06 |
| 8 | A | 40 | 1.5 | Cr free | 20 | 450 | 870 | 0.06 |
| 9 | A | 40 | 0.3 | Cr free | 10 | 450 | 870 | 0.06 |
| 10 | A | 40 | 0.3 | Cr free | 30 | 450 | 870 | 0.06 |
| 11 | A | 40 | 0.3 | Cr free | 20 | 350 | 870 | 0.06 |
| 12 | A | 40 | 0.3 | Cr free | 20 | 600 | 870 | 0.06 |
| 13 | A | 40 | 0.3 | Cr free | 20 | 450 | 800 | 0.06 |
| 14 | A | 40 | 0.3 | Cr free | 20 | 450 | 950 | 0.06 |
| 15 | A | 40 | 0.3 | Cr free | 20 | 450 | 1000 | 0.06 |
| 16 | A | 40 | 0.3 | Cr free | 20 | 450 | 870 | 0.01 |
| 17 | A | 40 | 0.3 | Cr free | 20 | 450 | 870 | 0.3 |
| 18 | A | 40 | 0.3 | Cr free | 20 | 450 | 870 | 1.5 |
| 19 | A | 40 | 0.3 | Cr free | 20 | 450 | 870 | 0.06 |
| 20 | A | 40 | 1.5 | Cr free | 20 | 450 | 870 | 0.06 |
| 21 | A | 40 | 1.5 | Cr free | 20 | 450 | 870 | 0.06 |
| 22 | A | 40 | 0.3 | Cr free | 20 | 450 | 870 | 0.06 |
| 23 | A | 40 | 1.5 | Cr free | 10 | 450 | 1000 | 0.02 |
| 24 | A | 60 | 0.3 | Cr free | 20 | 450 | 870 | 0.06 |
| 25 | A | 60 | 0.3 | Cr free | 40 | 700 | 870 | 2.5 |
| 26 | A | 60 | 0.3 | Cr contained | 20 | 450 | 870 | 0.06 |
| 27 | A | 100 | 1.2 | Cr free | 40 | 700 | 870 | 2.5 |
| 28 | A | 100 | 1.2 | Cr contained | 20 | 450 | 870 | 0.06 |
| 29 | A | 40 | 2.0 | | Not performed due to excessive oxidation of surface of base metal | | | |
| 30 | A | 40 | 0.3 | Cr contained | 20 | 450 | 870 | 0.06 |
| 31 | A | 40 | 0.3 | Cr free | 40 | 450 | 870 | 0.06 |
| 32 | A | 40 | 0.3 | Cr contained | 20 | 450 | 870 | 0.06 |
| 33 | A | 40 | 0.3 | Cr free | 32 | 450 | 870 | 0.06 |
| 34 | A | 40 | 0.3 | Cr free | 25 | 700 | 870 | 0.06 |

TABLE 3

| | | Annealing sparator application | | Insulation coating formation | | | | |
|---|---|---|---|---|---|---|---|---|
| | | | | | Heating rate | | | |
| Test No. | Steel | MgO/(MgO + Al$_2$O$_3$) (mass %) | Hydration water content (mass %) | Type of coating solution | from room temperature to 350° C. (° C./s) | Baking temperature (° C.) | Heat treatment temperature (° C.) | Oxidation degree of atmosphere PH$_2$O/PH$_2$ |
| 35 | A | 40 | 0.3 | Cr free | 20 | 450 | 870 | 0.06 |
| 36 | A | 40 | 0.3 | Cr free | 20 | 450 | 870 | 0.06 |
| 37 | A | 40 | 0.3 | Cr free | 20 | 450 | 870 | 0.06 |
| 38 | A | 40 | 0.3 | Cr free | 20 | 450 | 870 | 0.06 |
| 39 | A | 40 | 0.3 | Cr free | 20 | 450 | 870 | 0.06 |
| 40 | A | 40 | 0.3 | Cr free | 20 | 450 | 870 | 0.06 |
| 41 | A | 40 | 0.3 | Cr free | 20 | 450 | 870 | 0.06 |
| 42 | A | 40 | 0.3 | Cr free | 20 | 450 | 870 | 0.06 |
| 43 | A | 40 | 0.3 | Cr free | 20 | 450 | 870 | 0.06 |
| 44 | A | 40 | 1.5 | Cr free | 20 | 450 | 870 | 0.06 |
| 45 | A | 40 | 1.5 | Cr free | 20 | 450 | 870 | 0.06 |
| 46 | A | 40 | 1.5 | Cr free | 20 | 450 | 870 | 0.06 |
| 47 | A | 40 | 1.5 | Cr free | 20 | 450 | 870 | 0.06 |
| 48 | B | 40 | 0.3 | Cr free | 20 | 450 | 870 | 0.06 |
| 49 | C | 40 | 0.3 | Cr free | 20 | 450 | 870 | 0.06 |
| 50 | D | 40 | 0.3 | Cr free | 20 | 450 | 870 | 0.06 |
| 51 | E | 40 | 0.3 | Cr free | 20 | 450 | 870 | 0.06 |
| 52 | F | 40 | 0.3 | Cr free | 20 | 450 | 870 | 0.06 |
| 53 | G | 40 | 0.3 | Cr free | 20 | 450 | 870 | 0.06 |
| 54 | H | 40 | 0.3 | Cr free | 20 | 450 | 870 | 0.06 |
| 55 | I | 40 | 0.3 | Cr free | 20 | 450 | 870 | 0.06 |
| 56 | J | 40 | 0.3 | Cr free | 20 | 450 | 870 | 0.06 |
| 57 | K | 40 | 0.3 | Cr free | 20 | 450 | 870 | 0.06 |
| 58 | L | 40 | 0.3 | Cr free | 20 | 450 | 870 | 0.06 |
| 59 | M | 40 | 0.3 | Cr free | 20 | 450 | 870 | 0.06 |
| 60 | N | 40 | 0.3 | Cr free | 20 | 450 | 870 | 0.06 |
| 61 | O | 40 | 0.3 | Cr free | 20 | 450 | 870 | 0.06 |

The chemical composition of the silicon steel sheet, the film composition and average thickness of the intermediate layer, the coating composition and average thickness of the insulation coating, and the crystallization state in the insulation coating were measured for the obtained test Nos. 1 to 61 based on the above methods. These results are shown in Tables 4 to 7.

TABLE 4

| Test No. | Steel | Intermediate layer | | | | | | Insulation coating | | | | | | | |
|---|---|---|---|---|---|---|---|---|---|---|---|---|---|---|---|
| | | Composition of film (atomic %) | | | | | Average thickness (nm) | Composition of coating (atomic %) | | | | | | | Average thickness (μm) |
| | | Si | O | Mg | P | Fe | | P | Si | O | Al | Cr | Fe | Others | |
| 1 | A | 37 | 55 | 2 | 3 | 3 | 20 | 13 | 15 | 63 | 2 | 0.1 | 7 | — | 2 |
| 2 | A | 36 | 56 | 2 | 3 | 3 | 19 | 13 | 15 | 63 | 2 | 0.1 | 7 | — | 2 |
| 3 | A | 37 | 37 | 20 | 3 | 3 | 20 | 13 | 15 | 63 | 2 | 0.1 | 7 | — | 2 |
| 4 | A | 25 | 55 | 18 | 1 | 1 | 18 | 13 | 15 | 63 | 2 | 0.1 | 7 | — | 2 |
| 5 | A | 27 | 62 | 9 | 1 | 1 | 17 | 13 | 15 | 63 | 2 | 0.1 | 7 | — | 2 |
| 6 | A | 38 | 54 | 2 | 3 | 3 | 20 | 13 | 15 | 63 | 2 | 0.1 | 7 | — | 2 |
| 7 | A | 36 | 56 | 2 | 3 | 3 | 21 | 13 | 15 | 63 | 2 | 0.1 | 7 | — | 2 |
| 8 | A | 37 | 55 | 2 | 3 | 3 | 20 | 13 | 15 | 63 | 2 | 0.1 | 7 | — | 2 |
| 9 | A | 37 | 55 | 2 | 3 | 3 | 19 | 13 | 15 | 63 | 2 | 0.1 | 7 | — | 2 |
| 10 | A | 36 | 56 | 2 | 3 | 3 | 21 | 13 | 15 | 63 | 2 | 0.1 | 7 | — | 2 |
| 11 | A | 37 | 55 | 2 | 3 | 3 | 20 | 13 | 15 | 63 | 2 | 0.1 | 7 | — | 2 |
| 12 | A | 38 | 54 | 2 | 3 | 3 | 20 | 13 | 15 | 63 | 2 | 0.1 | 7 | — | 2 |
| 13 | A | 37 | 55 | 2 | 3 | 3 | 17 | 14 | 15 | 64 | 2 | 0.1 | 5 | — | 2 |
| 14 | A | 37 | 55 | 2 | 3 | 3 | 31 | 11 | 12 | 62 | 2 | 0.1 | 13 | — | 2 |
| 15 | A | 36 | 56 | 2 | 3 | 3 | 37 | 9 | 10 | 61 | 2 | 0.1 | 18 | — | 2 |
| 16 | A | 37 | 57 | 2 | 3 | 1 | 5 | 13 | 15 | 63 | 2 | 0.1 | 7 | — | 2 |
| 17 | A | 34 | 52 | 2 | 4 | 8 | 30 | 13 | 15 | 63 | 2 | 0.1 | 7 | — | 2 |
| 18 | A | 24 | 51 | 2 | 3 | 18 | 41 | 13 | 15 | 63 | 2 | 0.1 | 7 | — | 2 |
| 19 | A | 37 | 55 | 2 | 3 | 3 | 20 | 13 | 15 | 63 | 2 | 0.1 | 7 | — | 2 |
| 20 | A | 35 | 57 | 2 | 3 | 3 | 25 | 13 | 15 | 62 | 2 | 0.9 | 7 | — | 2 |
| 21 | A | 35 | 57 | 2 | 3 | 3 | 20 | 13 | 15 | 63 | 2 | 0.1 | 7 | — | 0.3 |
| 22 | A | 34 | 58 | 2 | 3 | 3 | 23 | 13 | 15 | 63 | 2 | 0.1 | 7 | — | 1 |

TABLE 4-continued

| | | Intermediate layer | | | | | Average thickness (nm) | Insulation coating | | | | | | | Average thickness (μm) |
|---|---|---|---|---|---|---|---|---|---|---|---|---|---|---|---|
| | | Composition of film (atomic %) | | | | | | Composition of coating (atomic %) | | | | | | | |
| Test No. | Steel | Si | O | Mg | P | Fe | | P | Si | O | Al | Cr | Fe | Others | |
| 23 | A | 25 | 71 | 2 | 1 | 1 | 140 | 13 | 15 | 63 | 2 | 0.1 | 7 | — | 2 |
| 24 | A | 21 | 53 | 21 | 4 | 1 | 700 | 14 | 15 | 66 | 2 | 0.1 | 3 | — | 2 |
| 25 | A | 22 | 52 | 21 | 4 | 1 | 710 | 14 | 15 | 66 | 2 | 0.1 | 3 | — | 2 |
| 26 | A | 21 | 53 | 21 | 4 | 1 | 705 | 14 | 15 | 65 | 2 | 1.5 | 3 | — | 2 |
| 27 | A | 20 | 47 | 28 | 4 | 1 | 1500 | 15 | 16 | 66 | 2 | 0.1 | 1 | — | 2 |
| 28 | A | 21 | 46 | 28 | 4 | 1 | 1510 | 15 | 16 | 65 | 2 | 1.5 | 1 | — | 2 |
| 29 | A | — | — | — | — | — | — | — | — | — | — | — | — | — | — |
| 30 | A | 37 | 55 | 2 | 3 | 3 | 20 | 13 | 15 | 62 | 2 | 1.5 | 7 | — | 2 |
| 31 | A | 37 | 55 | 2 | 3 | 3 | 20 | 13 | 15 | 63 | 2 | 0.1 | 7 | — | 2 |
| 32 | A | 36 | 36 | 2 | 3 | 3 | 22 | 13 | 15 | 62 | 2 | 1.2 | 7 | — | 2 |
| 33 | A | 39 | 53 | 2 | 3 | 3 | 24 | 13 | 15 | 63 | 2 | 0.1 | 7 | — | 2 |
| 34 | A | 38 | 54 | 2 | 3 | 3 | 29 | 13 | 15 | 63 | 2 | 0.1 | 7 | — | 2 |

TABLE 5

| | | Intermediate layer | | | | | Average thickness (nm) | Insulation coating | | | | | | | Average thickness (μm) |
|---|---|---|---|---|---|---|---|---|---|---|---|---|---|---|---|
| | | Composition of film (atomic %) | | | | | | Composition of coating (atomic %) | | | | | | | |
| Test No. | Steel | Si | O | Mg | P | Fe | | P | Si | O | Al | Cr | Fe | Others | |
| 35 | A | 38 | 54 | 2 | 3 | 3 | 21 | 13 | 15 | 62 | 2 | 0.1 | 7 | Mg: 1% | 2 |
| 36 | A | 36 | 56 | 2 | 3 | 3 | 20 | 13 | 15 | 62 | 2 | 0.1 | 7 | Mn: 1% | 2 |
| 37 | A | 37 | 55 | 2 | 3 | 3 | 19 | 13 | 15 | 62 | 2 | 0.1 | 7 | Ni: 1% | 2 |
| 38 | A | 36 | 56 | 2 | 3 | 3 | 20 | 13 | 15 | 62 | 2 | 0.1 | 7 | Zn: 1% | 2 |
| 39 | A | 37 | 55 | 2 | 3 | 3 | 21 | 13 | 15 | 62 | 2 | 0.1 | 7 | V: 1% | 2 |
| 40 | A | 37 | 55 | 2 | 3 | 3 | 20 | 13 | 15 | 62 | 2 | 0.1 | 7 | W: 1% | 2 |
| 41 | A | 37 | 55 | 2 | 3 | 3 | 20 | 13 | 15 | 62 | 2 | 0.1 | 7 | Zr: 1% | 2 |
| 42 | A | 38 | 54 | 2 | 3 | 3 | 19 | 13 | 15 | 62 | 2 | 0.1 | 7 | Co: 1% | 2 |
| 43 | A | 38 | 54 | 2 | 3 | 3 | 20 | 13 | 15 | 62 | 2 | 0.1 | 7 | Mo: 1% | 2 |
| 44 | A | 36 | 56 | 2 | 3 | 3 | 18 | 13 | 15 | 54 | 2 | 0.1 | 7 | Mg: 3%, V: 3%, Zr: 3% | 2 |
| 45 | A | 37 | 55 | 2 | 3 | 3 | 20 | 13 | 15 | 54 | 2 | 0.1 | 7 | Mn: 3%, V: 3%, W: 3% | 2 |
| 46 | A | 36 | 56 | 2 | 3 | 3 | 19 | 13 | 15 | 54 | 2 | 0.1 | 7 | Ni: 3%, Zn: 3%, Zr: 3% | 2 |
| 47 | A | 37 | 55 | 2 | 3 | 3 | 21 | 13 | 15 | 54 | 2 | 0.1 | 7 | Zn: 3%, Co: 3%, Mo: 3% | 2 |
| 48 | B | 37 | 55 | 2 | 3 | 3 | 17 | 13 | 15 | 63 | 2 | 0.1 | 7 | — | 2 |
| 49 | C | 36 | 56 | 2 | 3 | 3 | 22 | 13 | 15 | 63 | 2 | 0.1 | 7 | — | 2 |
| 50 | D | 37 | 55 | 2 | 3 | 3 | 20 | 13 | 15 | 63 | 2 | 0.1 | 7 | — | 2 |
| 51 | E | 37 | 55 | 2 | 3 | 3 | 21 | 13 | 15 | 63 | 2 | 0.1 | 7 | — | 2 |
| 52 | F | 38 | 54 | 2 | 3 | 3 | 22 | 13 | 15 | 63 | 2 | 0.1 | 7 | — | 2 |
| 53 | G | 37 | 55 | 2 | 3 | 3 | 22 | 13 | 15 | 63 | 2 | 0.1 | 7 | — | 2 |
| 54 | H | 36 | 56 | 2 | 3 | 3 | 18 | 13 | 15 | 63 | 2 | 0.1 | 7 | — | 2 |
| 55 | I | 38 | 54 | 2 | 3 | 3 | 20 | 13 | 15 | 63 | 2 | 0.1 | 7 | — | 2 |
| 56 | J | 37 | 53 | 2 | 3 | 3 | 21 | 13 | 15 | 63 | 2 | 0.1 | 7 | — | 2 |
| 57 | K | 37 | 55 | 2 | 3 | 3 | 19 | 13 | 15 | 63 | 2 | 0.1 | 7 | — | 2 |
| 58 | L | 36 | 56 | 2 | 3 | 3 | 20 | 13 | 15 | 63 | 2 | 0.1 | 7 | — | 2 |
| 59 | M | 36 | 56 | 2 | 3 | 3 | 21 | 13 | 15 | 63 | 2 | 0.1 | 7 | — | 2 |
| 60 | N | 38 | 54 | 2 | 3 | 3 | 20 | 13 | 15 | 63 | 2 | 0.1 | 7 | — | 2 |
| 61 | O | 37 | 55 | 2 | 3 | 3 | 18 | 13 | 15 | 63 | 2 | 0.1 | 7 | — | 2 |

TABLE 6

| | | Result of X-ray diffraction | | | | | Iron loss W17/50 (W/kg) | Coating adhesion | | |
|---|---|---|---|---|---|---|---|---|---|---|
| Test No. | Steel | Diffraction peak at 24.8° | $FWHM_{0.5}$ (a) (degree) | $FWHM_{1.0}$ (b) (degree) | Absolute value of (a) − (b) (degree) | Ratio of peak intensity | | 20 mm in diameter | 15 mm in diameter | |
| 1 | A | Present | 0.45 | 0.57 | 0.12 | 0.33 | 0.69 | Very Good | Very Good | Inventive example |
| 2 | A | Present | 0.44 | 0.54 | 0.10 | 0.34 | 0.67 | Very Good | Very Good | Inventive example |
| 3 | A | Present | 0.46 | 0.55 | 0.09 | 0.33 | 0.69 | Very Good | Very Good | Inventive example |

TABLE 6-continued

| Test No. | Steel | Diffraction peak at 24.8° | FWHM$_{0.5}$ (a) (degree) | FWHM$_{1.0}$ (b) (degree) | Absolute value of (a) − (b) (degree) | Ratio of peak intensity | Iron loss W17/50 (W/kg) | Coating adhesion 20 mm in diameter | Coating adhesion 15 mm in diameter | |
|---|---|---|---|---|---|---|---|---|---|---|
| 4 | A | Present | 0.53 | 0.43 | 0.10 | 0.38 | 0.65 | Very Good | Very Good | Inventive example |
| 5 | A | Present | 0.55 | 0.44 | 0.11 | 0.34 | 0.67 | Very Good | Very Good | Inventive example |
| 6 | A | Present | 0.42 | 0.50 | 0.14 | 0.32 | 0.66 | Very Good | Very Good | Inventive example |
| 7 | A | Present | 0.43 | 0.53 | 0.10 | 0.33 | 0.68 | Very Good | Very Good | Inventive example |
| 8 | A | Present | 0.44 | 0.56 | 0.12 | 0.35 | 0.69 | Very Good | Very Good | Inventive example |
| 9 | A | Present | 0.20 | 0.20 | 0.00 | 0.36 | 0.63 | Very Good | Very Good | Inventive example |
| 10 | A | Present | 1.00 | 2.00 | 1.00 | 0.40 | 0.64 | Very Good | Good | Inventive example |
| 11 | A | Present | 0.45 | 0.64 | 0.19 | 0.38 | 0.67 | Very Good | Good | Inventive example |
| 12 | A | Present | 0.42 | 0.55 | 0.13 | 0.31 | 0.63 | Very Good | Very Good | Inventive example |
| 13 | A | Present | 1.66 | 1.82 | 0.16 | 0.42 | 0.68 | Very Good | Good | Inventive example |
| 14 | A | Present | 0.24 | 0.35 | 0.11 | 0.24 | 0.66 | Very Good | Very Good | Inventive example |
| 15 | A | Present | 0.20 | 0.23 | 0.03 | 0.12 | 0.67 | Very Good | Very Good | Inventive example |
| 16 | A | Present | 0.20 | 0.21 | 0.01 | 0.25 | 0.66 | Very Good | Very Good | Inventive example |
| 17 | A | Present | 0.29 | 0.33 | 0.04 | 0.46 | 0.65 | Very Good | Very Good | Inventive example |
| 18 | A | Present | 1.68 | 1.91 | 0.23 | 0.47 | 0.68 | Very Good | Good | Inventive example |
| 19 | A | Present | 0.47 | 0.56 | 0.09 | 0.36 | 0.63 | Very Good | Very Good | Inventive example |
| 20 | A | Present | 0.51 | 0.48 | 0.03 | 0.40 | 0.65 | Very Good | Very Good | Inventive example |
| 21 | A | Present | 0.55 | 0.42 | 0.13 | 0.48 | 0.68 | Very Good | Very Good | Inventive example |
| 22 | A | Present | 0.45 | 0.54 | 0.09 | 0.36 | 0.64 | Very Good | Very Good | Inventive example |
| 23 | A | Present | 0.54 | 0.41 | 0.13 | 0.38 | 0.69 | Very Good | Very Good | Inventive example |
| 24 | A | Present | 0.43 | 0.56 | 0.13 | 0.36 | 0.71 | Very Good | Very Good | Comparative example |
| 25 | A | Present | 0.55 | 2.35 | 1.80 | 0.72 | 0.73 | Very Good | Very Good | Comparative example |
| 26 | A | Present | 0.42 | 0.61 | 0.19 | 0.81 | 0.77 | Very Good | Very Good | Comparative example |
| 27 | A | Absent | — | — | — | — | 0.73 | Very Good | Very Good | Comparative example |
| 28 | A | Present | 0.42 | 0.61 | 0.19 | 0.83 | 0.77 | Very Good | Very Good | Comparative example |
| 29 | A | — | — | — | — | — | — | — | — | Comparative example |
| 30 | A | Present | 0.56 | 2.16 | 1.60 | 0.82 | 0.64 | Good | Poor | Comparative example |
| 31 | A | Present | 0.57 | 2.33 | 1.76 | 0.52 | 0.69 | Good | NG | Comparative example |
| 32 | A | Present | 0.31 | 1.62 | 1.31 | 0.74 | 0.68 | Very Good | Poor | Comparative example |
| 33 | A | Present | 0.12 | 1.32 | 1.20 | 0.76 | 0.67 | Very Good | Poor | Comparative example |
| 34 | A | Present | 0.08 | 1.25 | 1.17 | 0.79 | 0.68 | Poor | Poor | Comparative example |

TABLE 7

| | | Result of X-ray diffraction | | | | | Iron loss | Coating adhesion | | |
|---|---|---|---|---|---|---|---|---|---|---|
| Test No. | Steel | Diffraction peak at 24.8° | $FWHM_{0.5}$ (a) (degree) | $FWHM_{1.0}$ (b) (degree) | Absolute value of (a) − (b) (degree) | Ratio of peak intensity | W17/50 (W/kg) | 20 mm in diameter | 15 mm in diameter | |
| 35 | A | Present | 0.47 | 0.56 | 0.09 | 0.36 | 0.63 | Very Good | Very Good | Inventive example |
| 36 | A | Present | 0.47 | 0.56 | 0.09 | 0.35 | 0.64 | Very Good | Very Good | Inventive example |
| 37 | A | Present | 0.47 | 0.55 | 0.08 | 0.37 | 0.63 | Very Good | Very Good | Inventive example |
| 38 | A | Present | 0.47 | 0.56 | 0.09 | 0.36 | 0.62 | Very Good | Very Good | Inventive example |
| 39 | A | Present | 0.48 | 0.57 | 0.09 | 0.34 | 0.63 | Very Good | Very Good | Inventive example |
| 40 | A | Present | 0.47 | 0.56 | 0.09 | 0.35 | 0.63 | Very Good | Very Good | Inventive example |
| 41 | A | Present | 0.46 | 0.56 | 0.10 | 0.35 | 0.64 | Very Good | Very Good | Inventive example |
| 42 | A | Present | 0.47 | 0.55 | 0.08 | 0.36 | 0.63 | Very Good | Very Good | Inventive example |
| 43 | A | Present | 0.47 | 0.56 | 0.09 | 0.33 | 0.63 | Very Good | Very Good | Inventive example |
| 44 | A | Present | 0.44 | 0.56 | 0.12 | 0.35 | 0.69 | Very Good | Very Good | Inventive example |
| 45 | A | Present | 0.45 | 0.53 | 0.08 | 0.36 | 0.68 | Very Good | Very Good | Inventive example |
| 46 | A | Present | 0.43 | 0.52 | 0.09 | 0.35 | 0.69 | Very Good | Very Good | Inventive example |
| 47 | A | Present | 0.45 | 0.53 | 0.08 | 0.35 | 0.67 | Very Good | Very Good | Inventive example |
| 48 | B | Present | 0.47 | 0.57 | 0.10 | 0.32 | 0.64 | Very Good | Very Good | Inventive example |
| 49 | C | Present | 0.48 | 0.56 | 0.08 | 0.33 | 0.63 | Very Good | Very Good | Inventive example |
| 50 | D | Present | 0.47 | 0.56 | 0.09 | 0.36 | 0.63 | Very Good | Very Good | Inventive example |
| 51 | E | Present | 0.47 | 0.55 | 0.08 | 0.35 | 0.62 | Very Good | Very Good | Inventive example |
| 52 | F | Present | 0.46 | 0.55 | 0.09 | 0.34 | 0.64 | Very Good | Very Good | Inventive example |
| 53 | G | Present | 0.46 | 0.57 | 0.11 | 0.36 | 0.63 | Very Good | Very Good | Inventive example |
| 54 | H | Present | 0.46 | 0.55 | 0.09 | 0.33 | 0.63 | Very Good | Very Good | Inventive example |
| 55 | I | Present | 0.48 | 0.56 | 0.08 | 0.32 | 0.64 | Very Good | Very Good | Inventive example |
| 56 | J | Present | 0.47 | 0.55 | 0.08 | 0.34 | 0.63 | Very Good | Very Good | Inventive example |
| 57 | K | Present | 0.46 | 0.55 | 0.09 | 0.36 | 0.62 | Very Good | Very Good | Inventive example |
| 58 | K | Present | 0.47 | 0.56 | 0.09 | 0.37 | 0.62 | Very Good | Very Good | Inventive example |
| 59 | M | Present | 0.46 | 0.56 | 0.10 | 0.33 | 0.63 | Very Good | Very Good | Inventive example |
| 60 | N | Present | 0.48 | 0.57 | 0.09 | 0.32 | 0.63 | Very Good | Very Good | Inventive example |
| 61 | O | Present | 0.48 | 0.56 | 0.08 | 0.34 | 0.62 | Very Good | Very Good | Inventive example |

In addition, the iron loss and coating adhesion of the obtained test Nos. 1-61 were also evaluated.

<Iron Loss>

The iron loss $W_{17/50}$ (W/kg) of a sample taken from the produced grain-oriented electrical steel sheet was measured at an excitation flux density of 1.7 T and frequency of 50 Hz by the Epstein test based on JIS C 2550-1:2011. The iron loss $W_{17/50}$ of less than 0.70 W/kg was judged to be acceptable.

<Coating Adhesion>

The coating adhesion of the insulation coating was evaluated by the remained area fraction of the coating when a test piece taken from the produced grain-oriented electrical steel sheet was wound (180° bent) around cylinders of 20 mm and 15 mm in diameter, respectively, and then bent back. The coating adhesion of the insulation coating was evaluated by visually determining whether or not the insulation coating peeled off. No peeling off from the steel sheet and 90% or more of the coating remained area ratio was considered "Very Good," 85% or more and less than 90% was considered "Good," 80% or more and less than 85% was considered "Poor," and 80% or less was considered "NG." For both 20 mm and 15 mm diameter test conditions, a coating remained area of 85% or more ("Very Good" or "Good" above) was judged to be acceptable.

The results are shown together in Tables 6 and 7.

As can be seen from Tables 1 to 7, the inventive examples Nos. 1 to 23 and Nos. 35 to 61 satisfied the inventive range of product characteristics and had excellent coating adhesion. They also had excellent iron loss characteristics. In contrast, the comparative examples, Nos. 24 to 34, had at least one of the product features outside the inventive range, and had inferior iron loss and/or coating adhesion properties.

INDUSTRIAL APPLICABILITY

According to the above embodiments of the present invention, grain-oriented electrical steel sheets with excellent insulation coating adhesion can be provided even without forsterite film. Therefore, it has high industrial applicability.

REFERENCE SIGNS LIST 1. base material steel sheet (silicon steel sheet)
2. intermediate layer (oxide film)
3. insulation coating (phosphate coating)

The invention claimed is:
1. A grain-oriented electrical steel sheet comprising:
a base metal steel sheet,
an intermediate layer disposed on and in contact with the base metal steel sheet, and
an insulation coating disposed on and in contact with the intermediate layer,
wherein the intermediate layer is an oxide film satisfying the followings:
Si content: 20 to 70 atomic %,
O content: 30 to 80 atomic %,
Mg content: 20 atomic % or less,
P content: 5 atomic % or less, and
Fe content: less than 20 atomic %; and
the average thickness of the oxide film is 2 to 500 nm; and
wherein the insulation coating is a phosphate coating satisfying the followings:
P content: 5 to 30 atomic %,
Si content: 5 to 30 atomic %,
O content: 30 to 80 atomic %,
Al content: 0.1 to 10 atomic %,
Cr content: less than 1 atomic %,
Fe content: less than 25 atomic %,
Mg content: 0 to 10 atomic %,
Mn content: 0 to 10 atomic %,
Ni content: 0 to 10 atomic %,
Zn content: 0 to 10 atomic %,
V content: 0 to 10 atomic %,
W content: 0 to 10 atomic %,
Zr content: 0 to 10 atomic %,
Co content: 0 to 10 atomic %, and
Mo content: 0 to 10 atomic %, and
the average thickness of the phosphate coating is between 0.1 μm and 10 μm, and
wherein when grazing incidence X-ray diffraction is performed on the phosphate coating using a Co-Kα excitation source, the X-ray diffraction pattern has a diffraction peak originating from cristobalite-type aluminum phosphate at a diffraction angle of 2θ=24.8°,
wherein a peak intensity of a diffraction peak appearing at a diffraction angle 2θ=34.3° is 0.50 times or less than a peak intensity of the diffraction peak appearing at the diffraction angle 2θ=24.8° under diffraction conditions where an X-ray incident angle ω=0.5°,
and
when a half value width of a diffraction peak under a diffraction condition where the X-ray incident angle ω=0.5° is represented as $FWHM_{0.5}$ and a half value width of a diffraction peak under the diffraction condition where the X-ray incident angle ω=1.0° is represented as $FWHM_{1.0}$, $FWHM_{0.5}$ and $FWHM_{1.0}$ satisfy the followings:
$0.20° \leq FWHM_{0.5} \leq 2.00°$,
$0.20° \leq FWHM_{1.0} \leq 2.00°$, and
$0° \leq |FWHM_{0.5} - FWHM_{1.0}| \leq 1.00°$.

* * * * *